(12) United States Patent
Kakimoto

(10) Patent No.: US 8,004,944 B2
(45) Date of Patent: Aug. 23, 2011

(54) METHOD OF SETTING RECORDING SETUP INFORMATION ABOUT OPTICAL DISK, PROGRAM THEREFOR, AND DATA RECORDING PLAYER

(75) Inventor: Hiroya Kakimoto, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 536 days.

(21) Appl. No.: 12/165,833

(22) Filed: Jul. 1, 2008

(65) Prior Publication Data

US 2009/0016185 A1   Jan. 15, 2009

(30) Foreign Application Priority Data

Jul. 2, 2007 (JP) ................................ 2007-173627
Jul. 2, 2007 (JP) ................................ 2007-173628

(51) Int. Cl.
*G11B 7/00* (2006.01)
(52) U.S. Cl. ............... 369/53.22; 369/47.53; 369/47.5; 369/59.11; 369/47.1
(58) Field of Classification Search .............. None
See application file for complete search history.

(56) References Cited

U.S. PATENT DOCUMENTS

| 6,915,374 B2 * | 7/2005 | Pereira ..................... 369/47.53 |
| 7,423,943 B2 * | 9/2008 | Halloush et al. ........... 369/47.49 |
| 7,593,299 B2 * | 9/2009 | Akahoshi et al. .......... 369/47.54 |

FOREIGN PATENT DOCUMENTS

| JP | 2003-228836 | 8/2003 |
| JP | 2005-122840 | 5/2005 |

* cited by examiner

*Primary Examiner* — Muhammad N Edun
(74) *Attorney, Agent, or Firm* — Law Office of Katsuhiro Arai

(57) ABSTRACT

There is disclosed a method of permitting recording setup information required to perform a test recording on an optical disk to be obtained from an external device as the need arises. The method comprises the steps of: measuring an evaluation index associated with recording characteristics with which data was recorded on the optical disk by an optical disk drive; making a decision as to whether the measured evaluation index indicates a state in which recording setup information used in data recording by the optical disk drive should be updated; acquiring recording setup information corresponding to at least the machine ID of the optical disk drive and the medium ID of the optical disk when the evaluation index is judged to indicate the state in which the recording setup information should be updated; and setting the acquired recording setup information in the optical disk drive.

42 Claims, 25 Drawing Sheets

[Fig. 1]
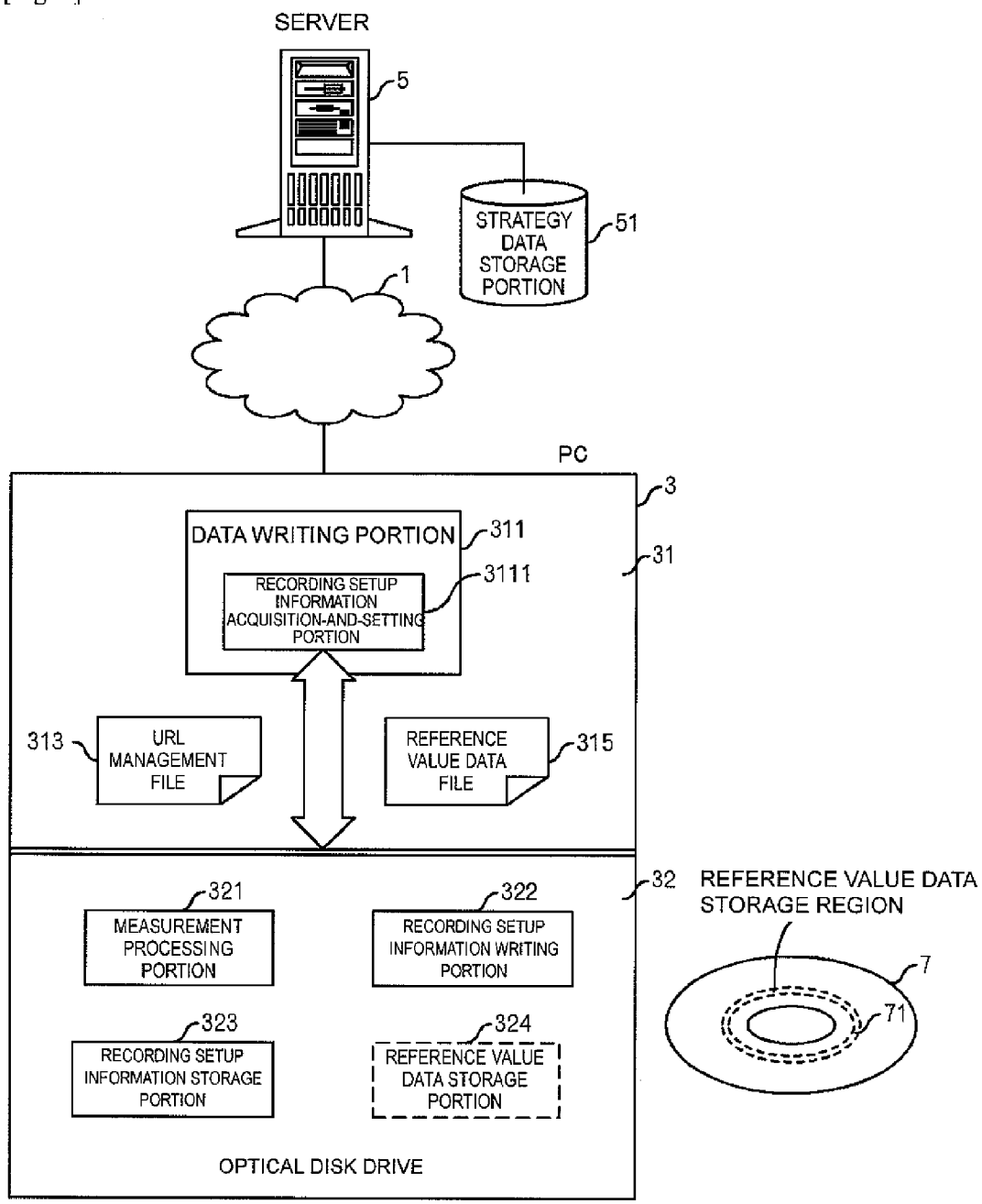

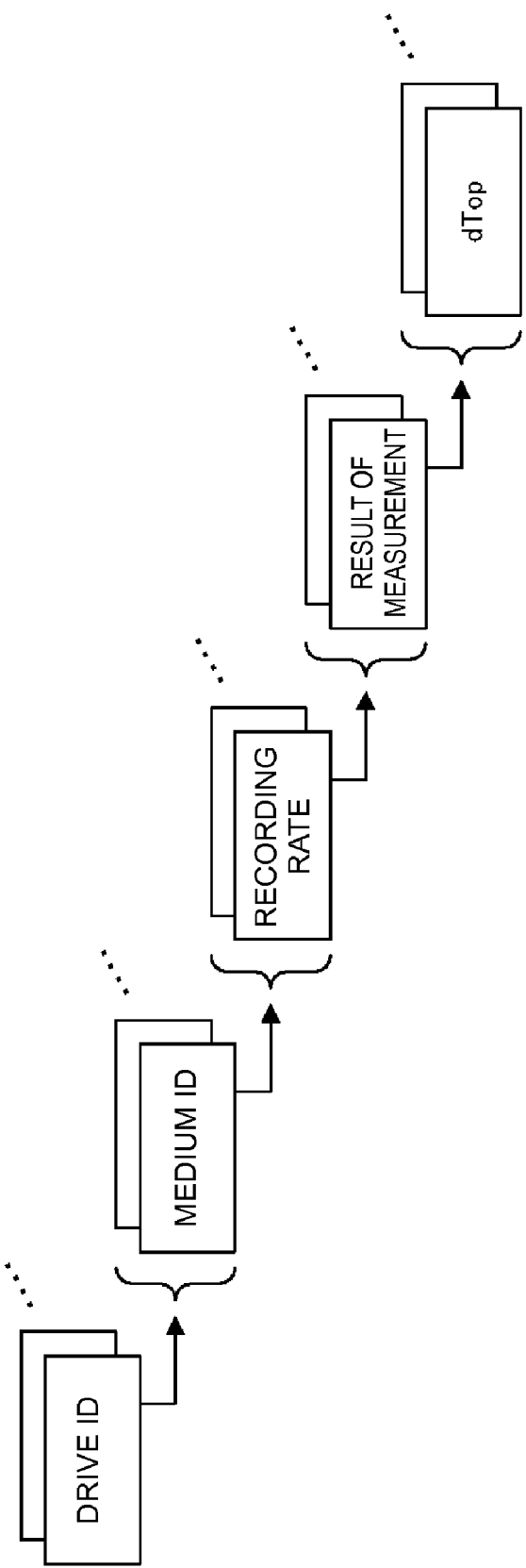
[Fig. 2]

[Fig. 3]
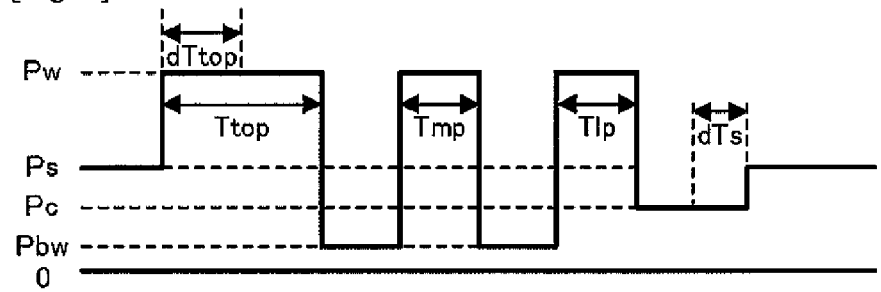
[Fig. 4]
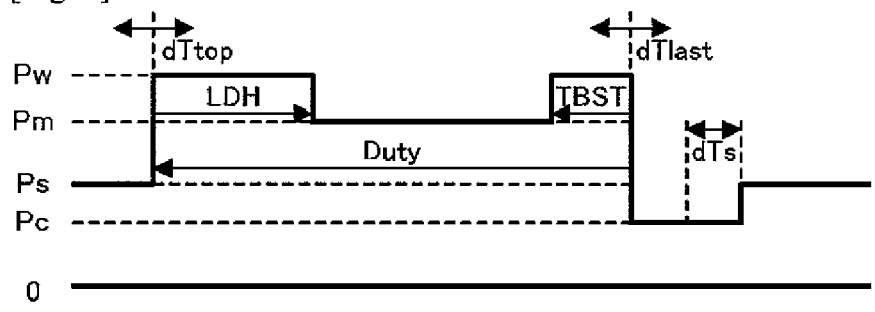
[Fig. 5]
MARK
| SPACE | | 2T | 3T | 4T | 5T | 6T≦ |
|---|---|---|---|---|---|---|
| | 2T | | | | | |
| | 3T | | | | | |
| | 4T | | | | | |
| | 5T≦ | | | | | |
[Fig. 6]
| MEDIUM ID | URL |
|---|---|
| ID_A | ftp://a.b.com |
| ID_B | ftp://c.d.com |
| ⋮ | ⋮ |

[Fig. 7]
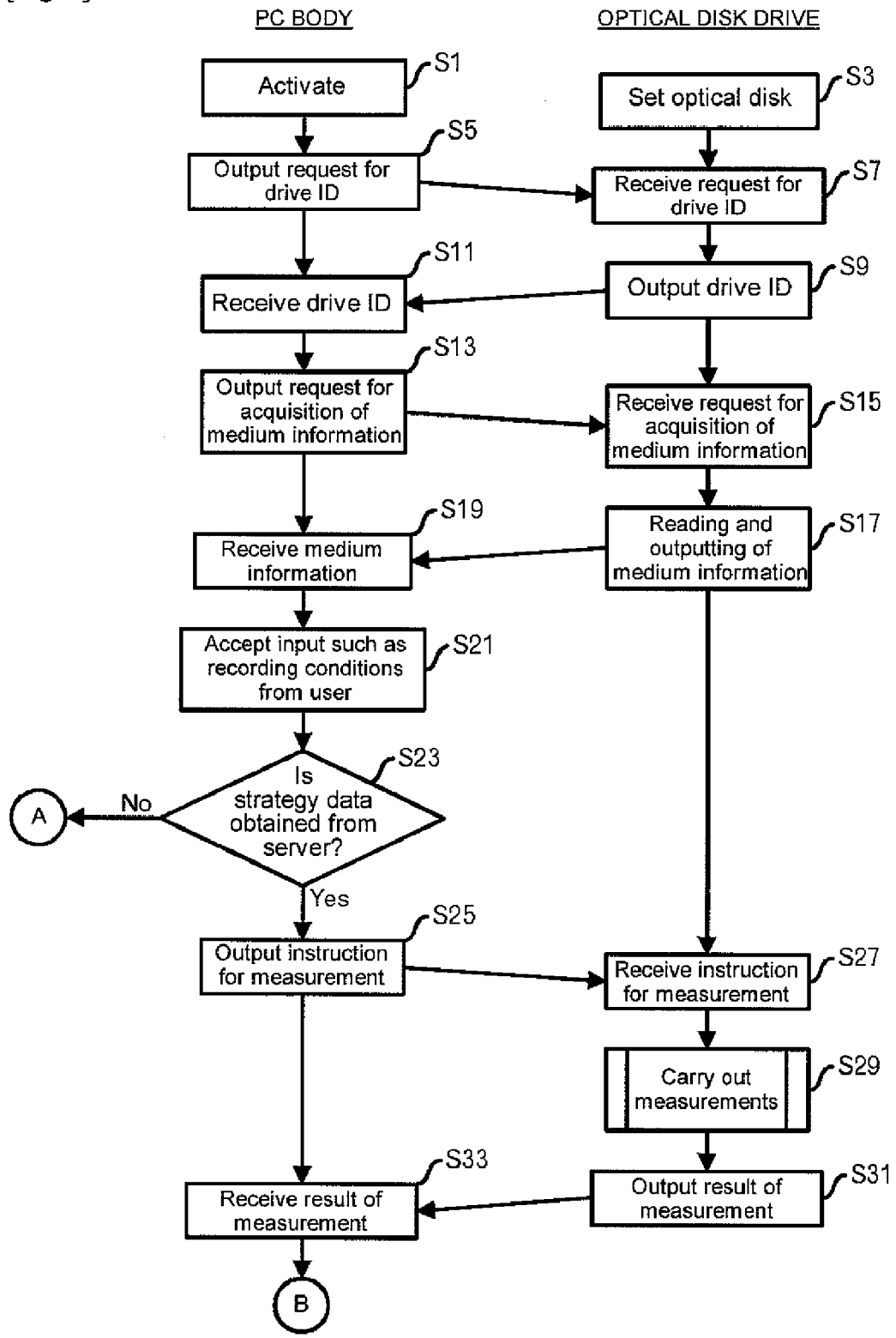

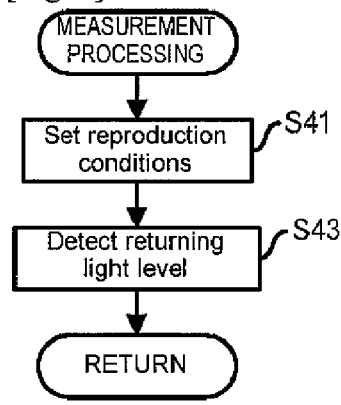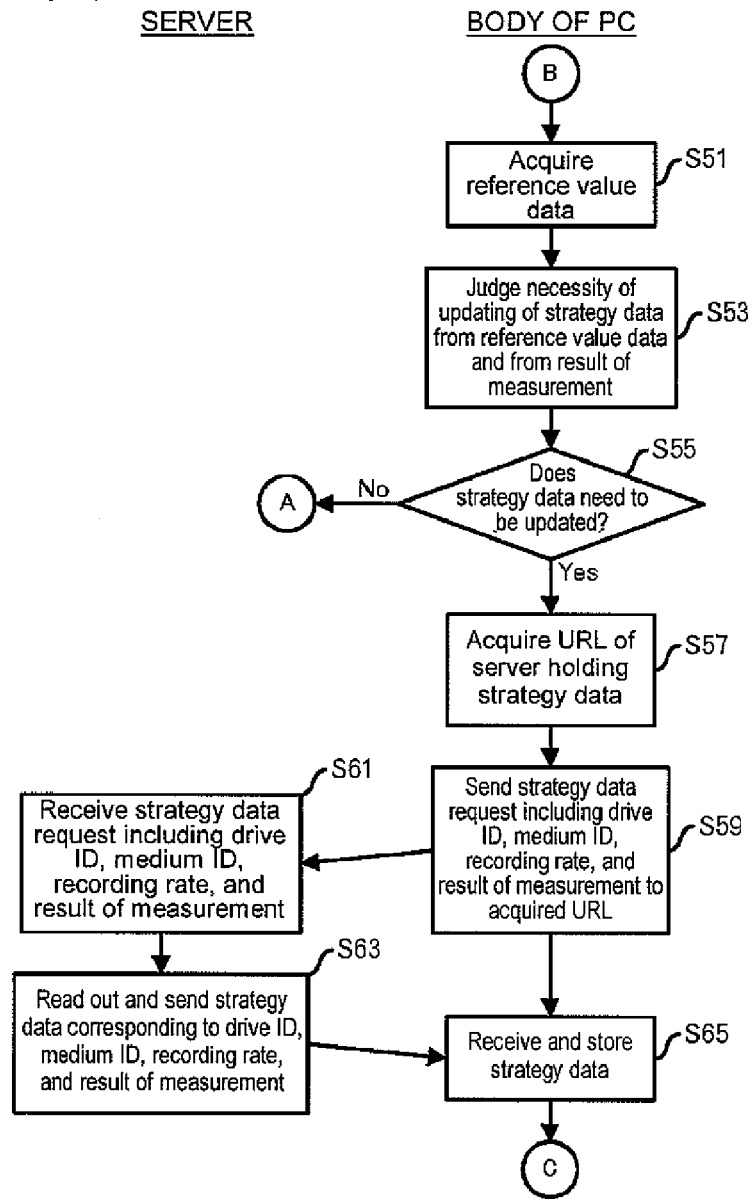

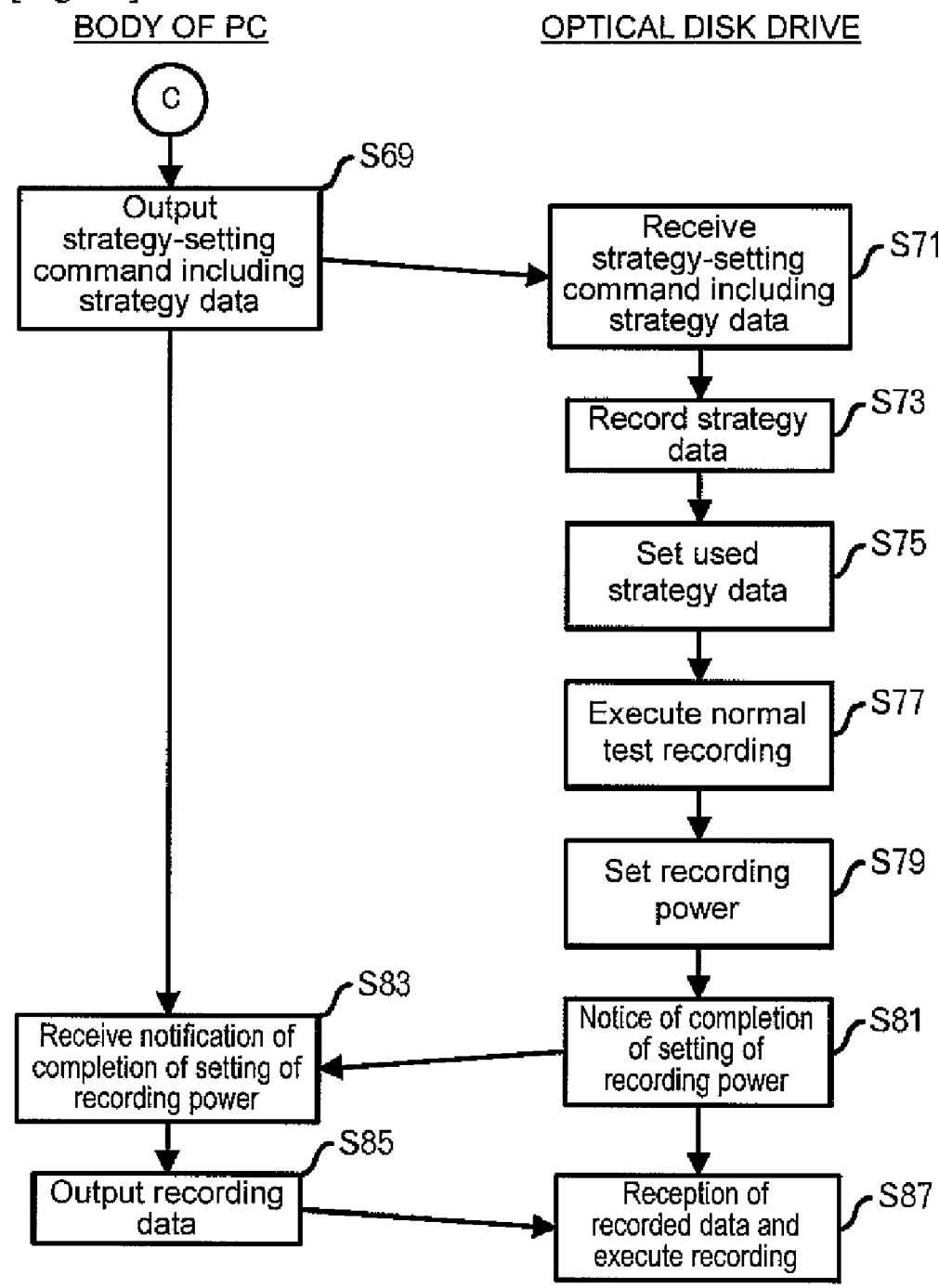

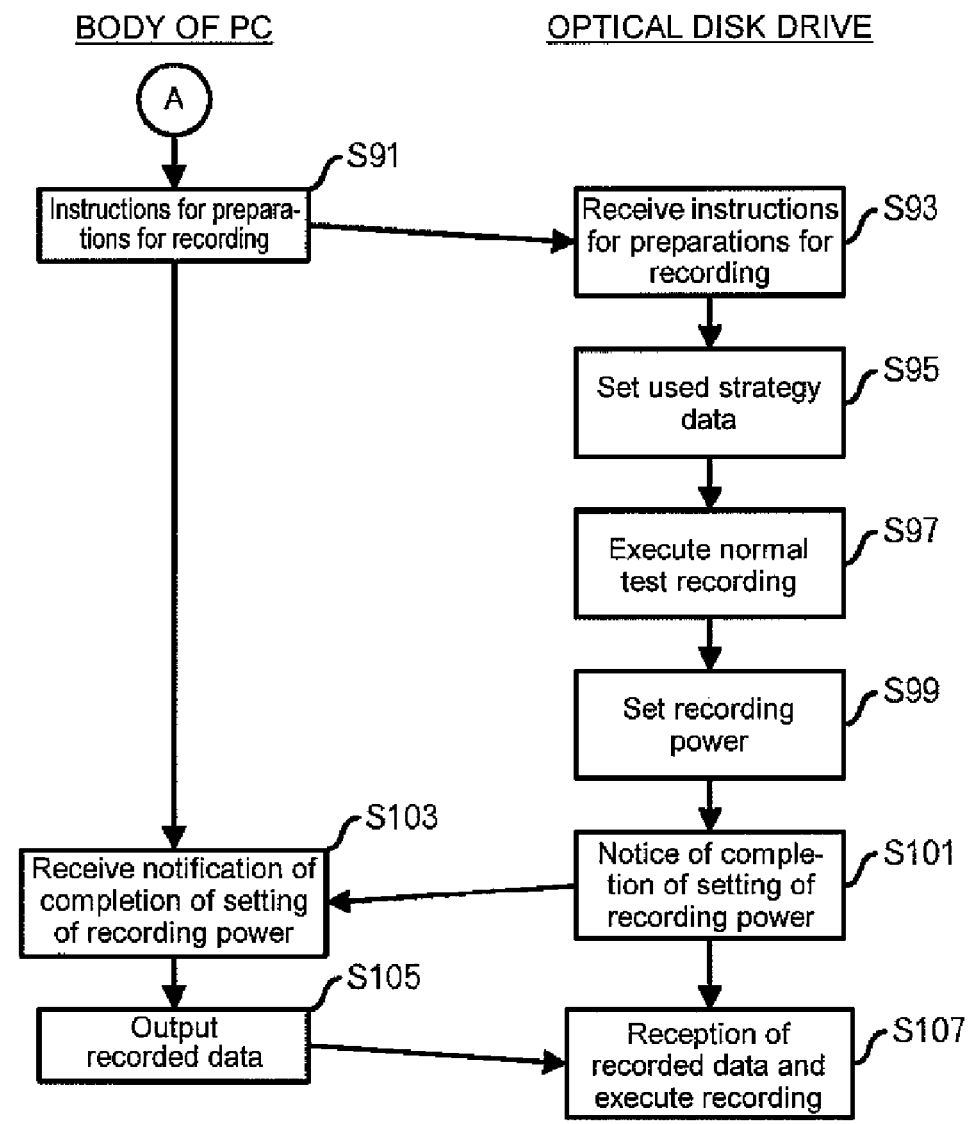

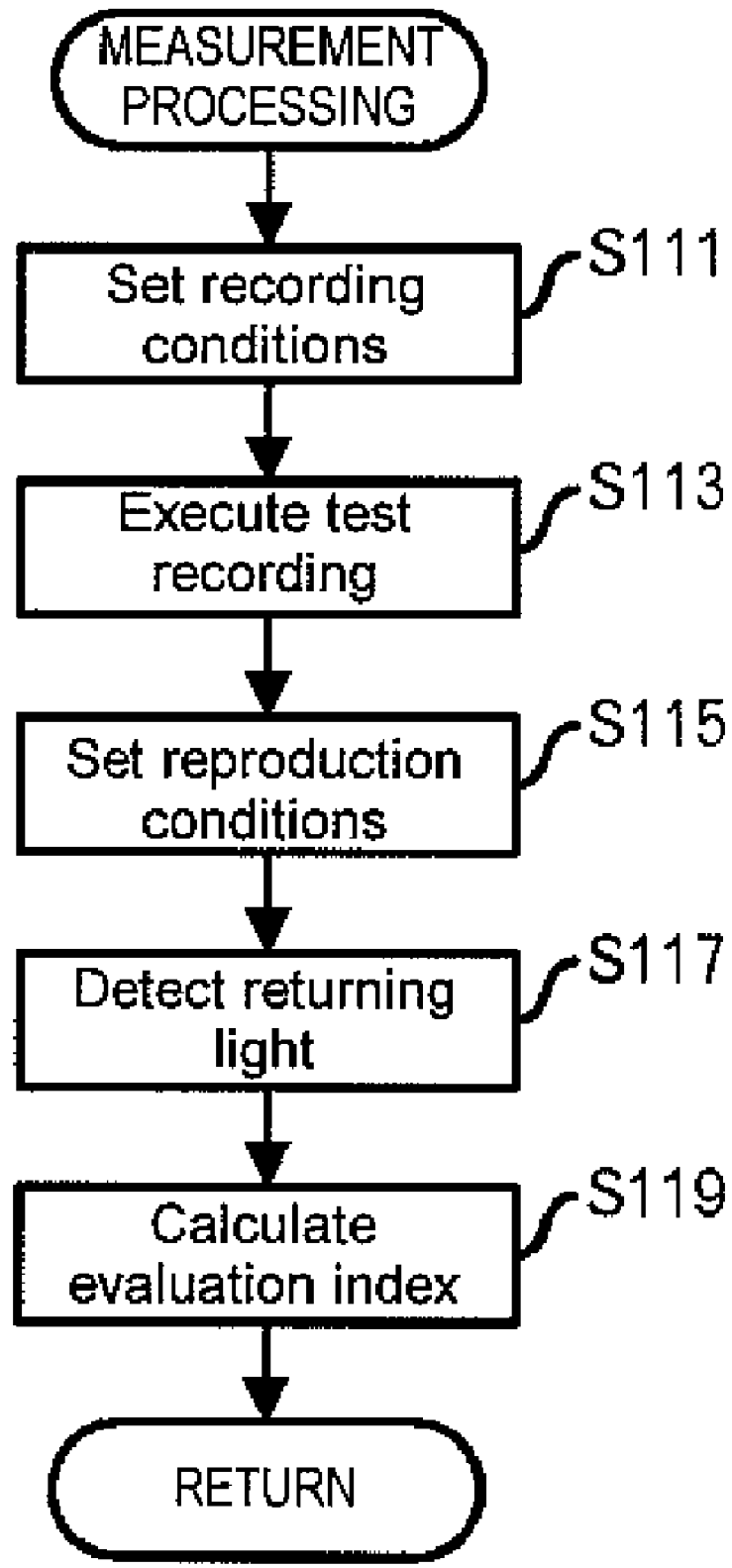
[Fig. 12]

[Fig. 13]
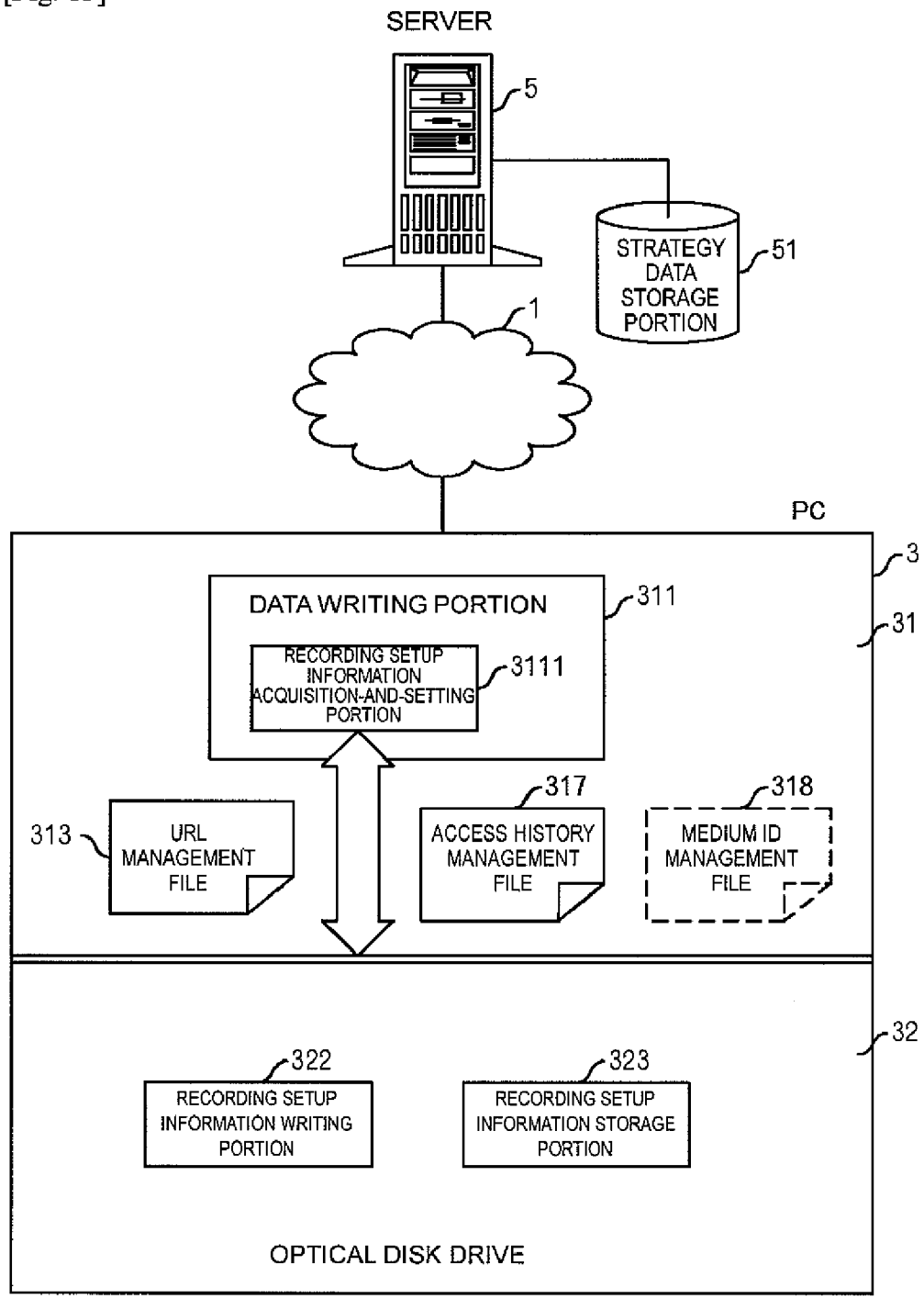

[Fig. 14]
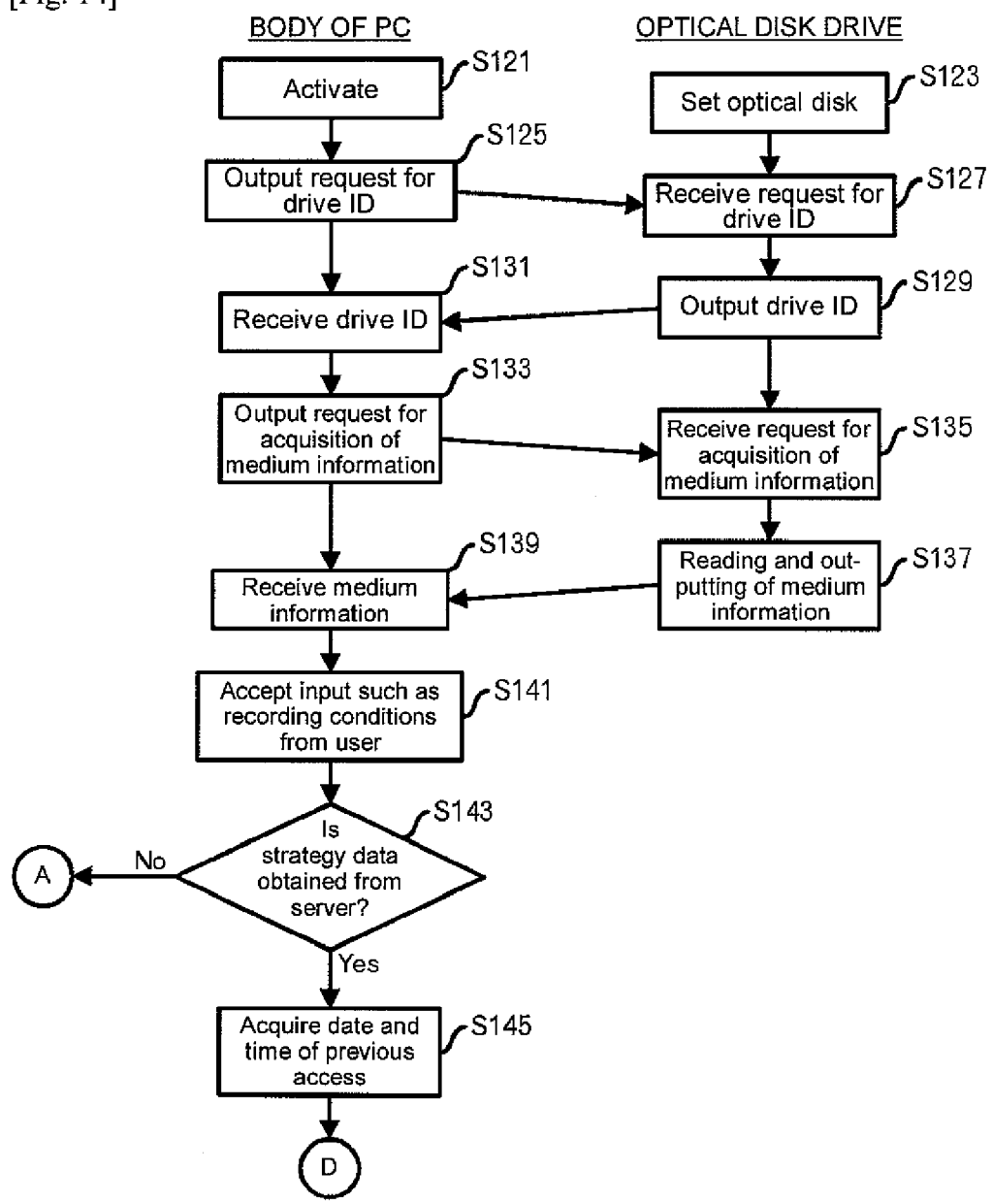
[Fig. 15]

[Fig. 16]
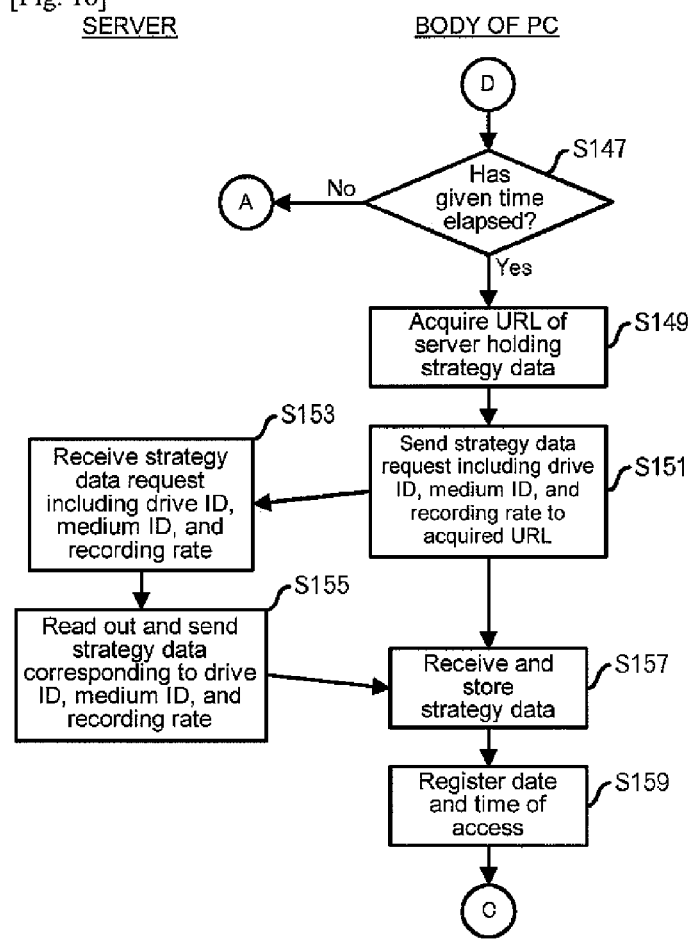
[Fig. 17]
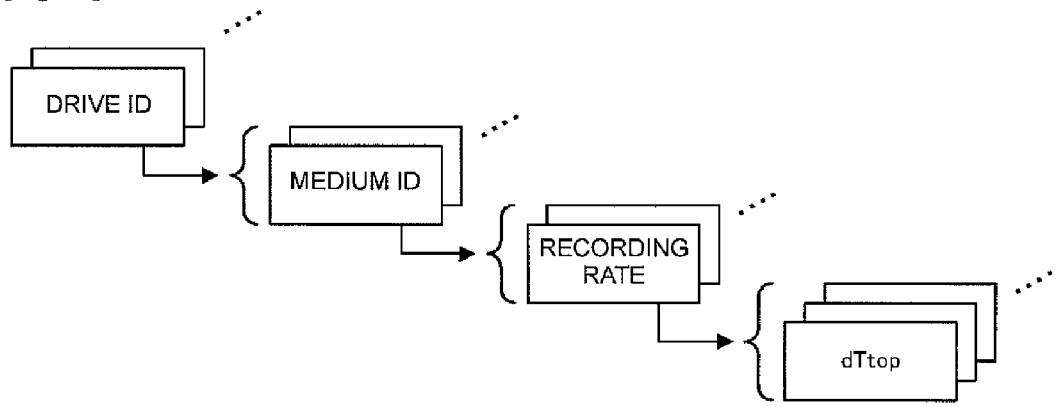

[Fig. 18]

| MEDIUM ID | NUMBER OF USES | DATE OF PREVIOUS USE | ORDER |
|---|---|---|---|
| ID_A | 20 | 20070411 | 1 |
| ID_B | 4 | 20051103 | 15 |
| ID_C | 12 | 20070319 | 3 |
| ID_D | 1 | 20051103 | 20 |
| ID_E | 8 | 20070319 | 6 |
| ⋮ | ⋮ | ⋮ | ⋮ |

[Fig. 19]

| MEDIUM ID | DATE OF PREVIOUS USE |
|---|---|
| ID_A | 20070411 |
| ID_B | 20051103 |
| ID_C | 20070319 |
| ID_D | 20051103 |
| ID_E | 20070319 |
| ⋮ | ⋮ |

[Fig. 20]
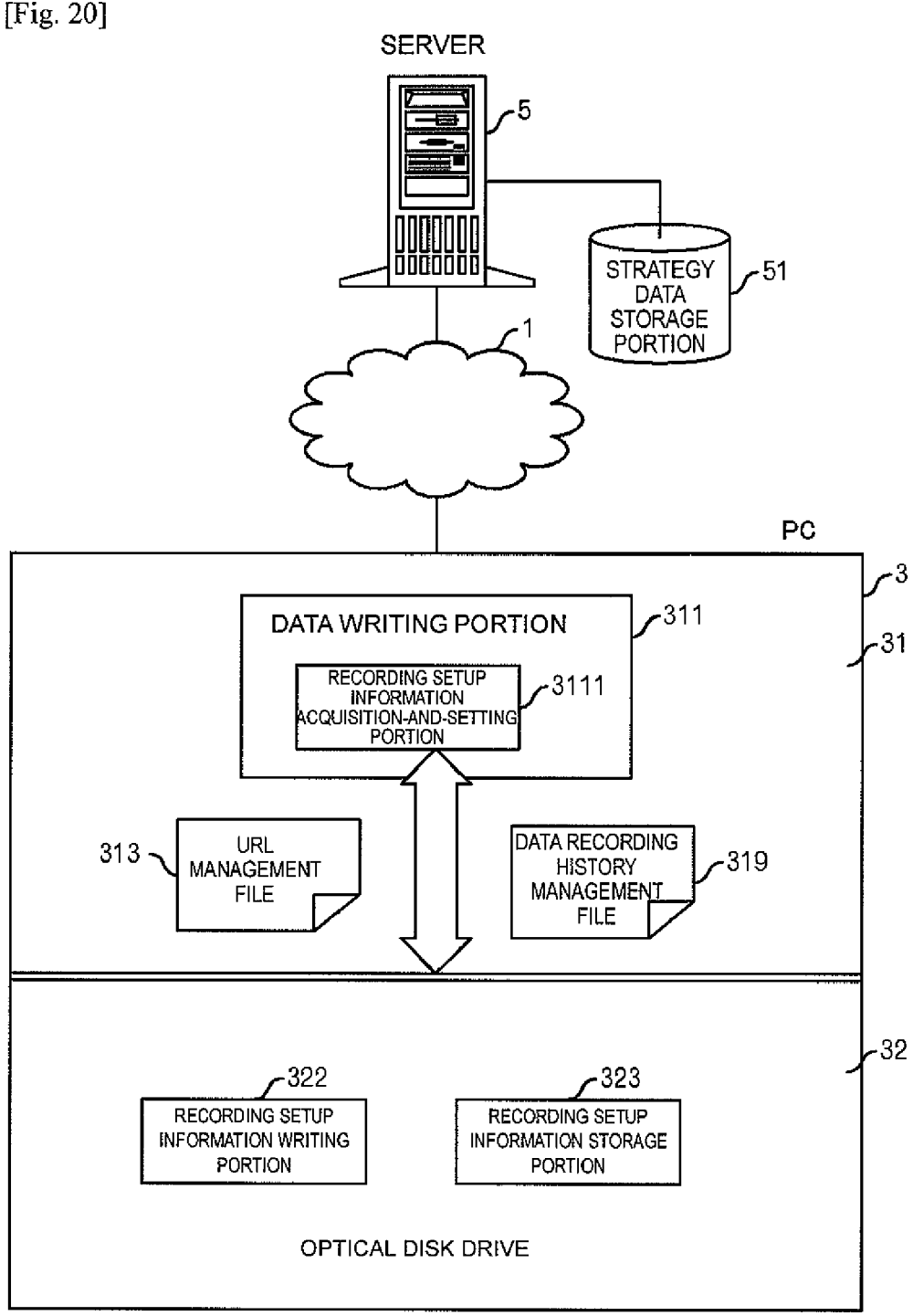

[Fig. 21]
| DATE AND TIME OF DATA RECORDING | ACCESSED OR NOT |
|---|---|
| ⋮ | ⋮ |
| ⋮ | ⋮ |
| 200705190301 | × |
| 200705210830 | ○ |
| 200705241640 | × |
[Fig. 22]
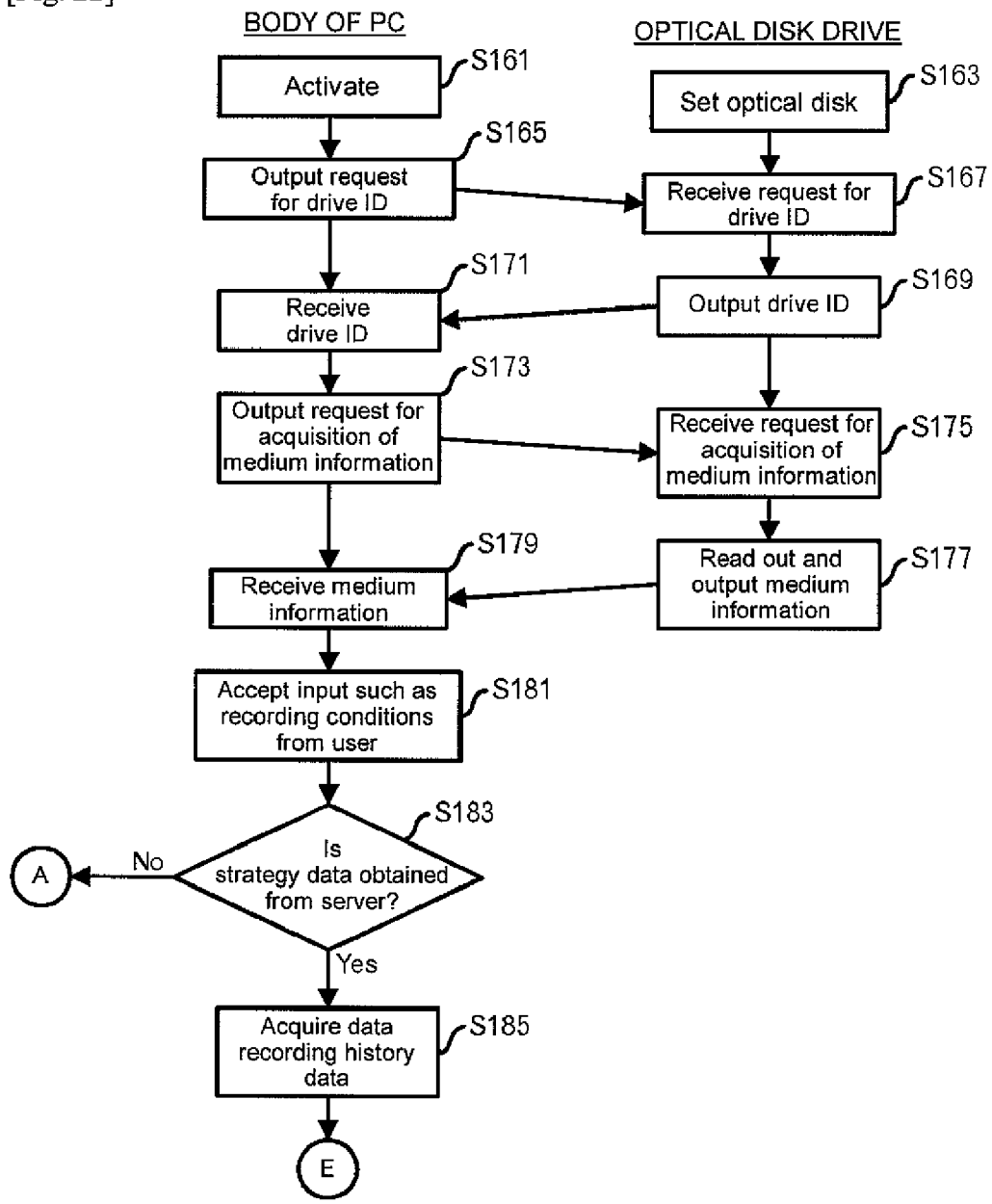

[Fig. 23]
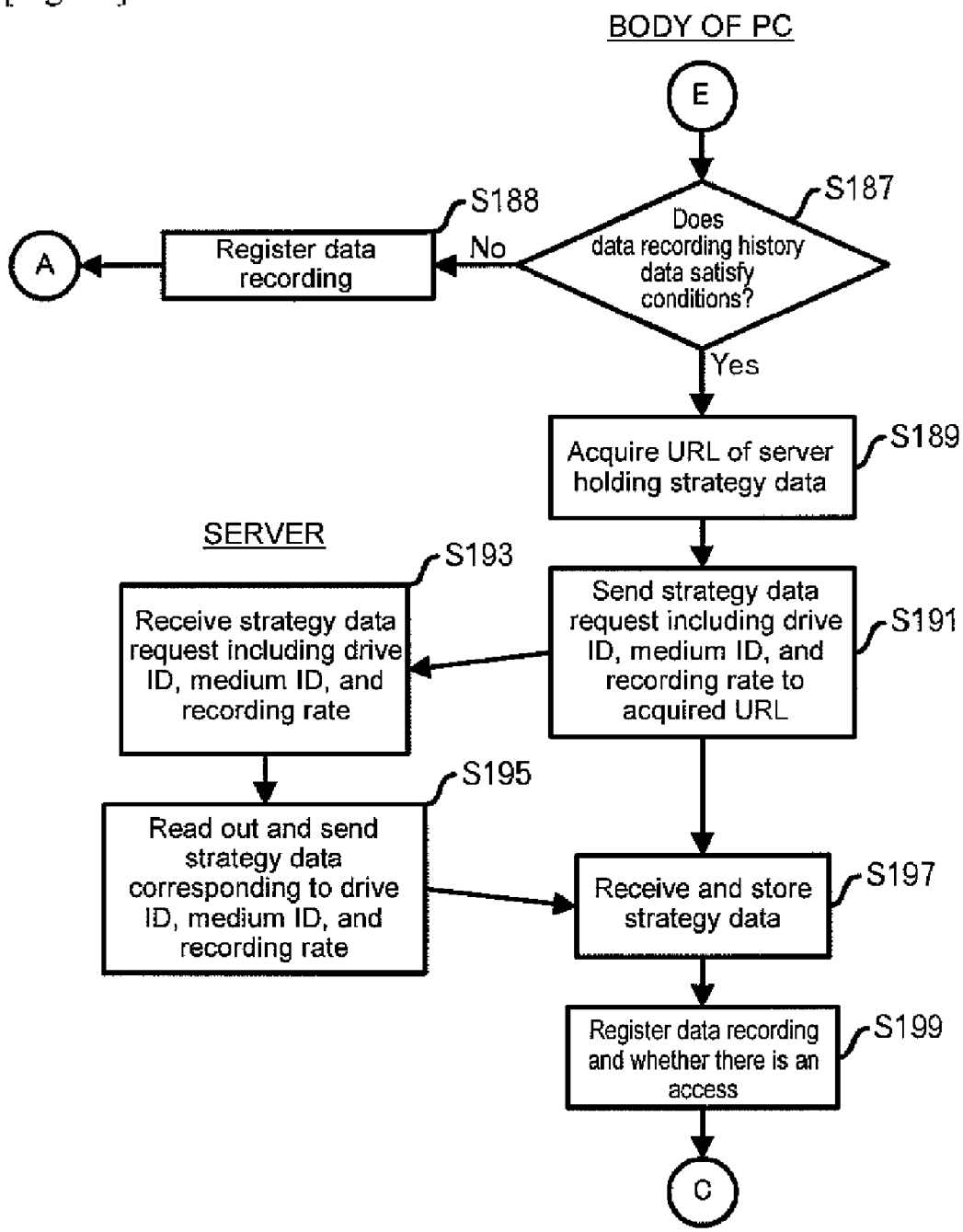

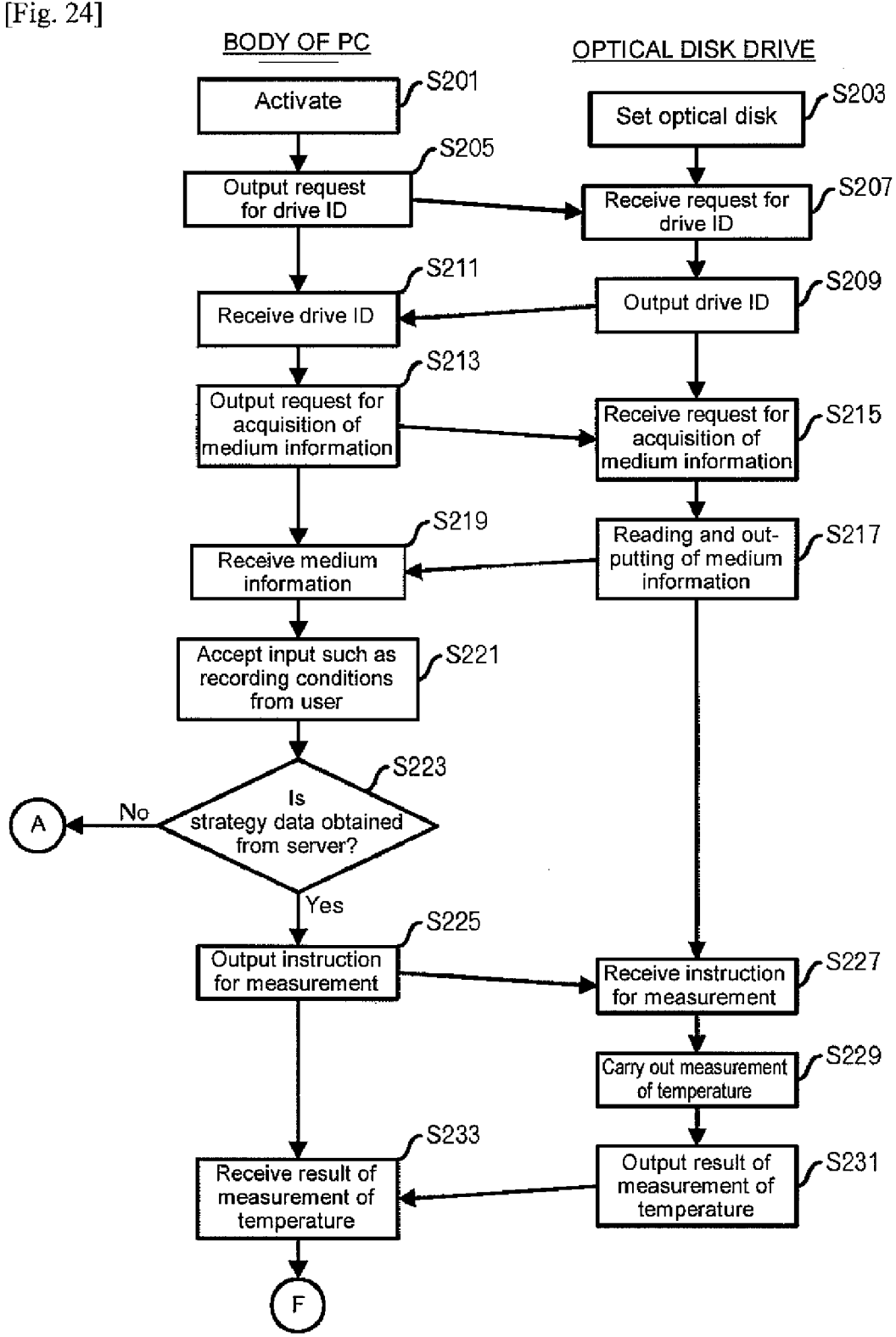
[Fig. 24]

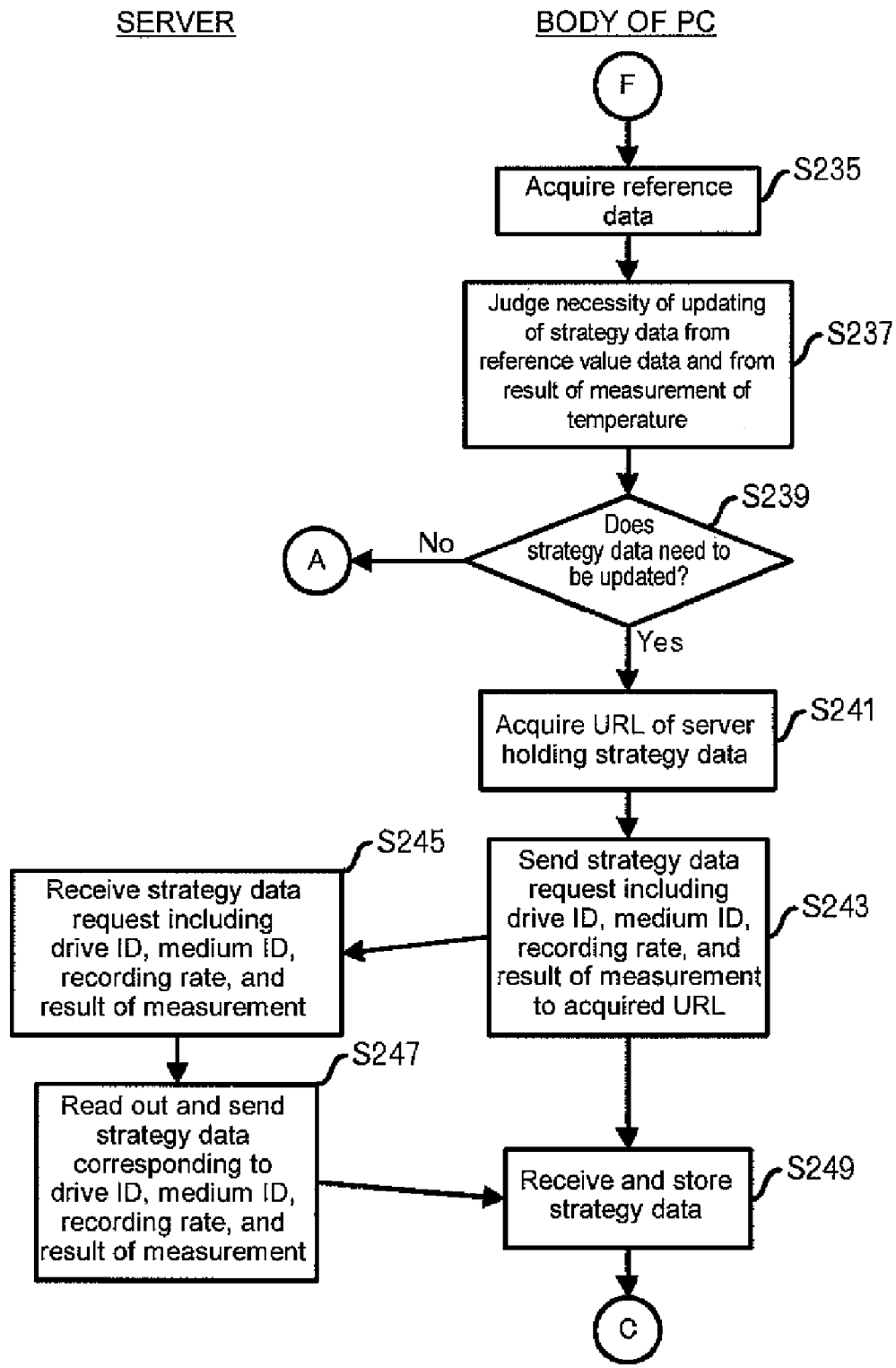
[Fig. 25]

[Fig. 26]
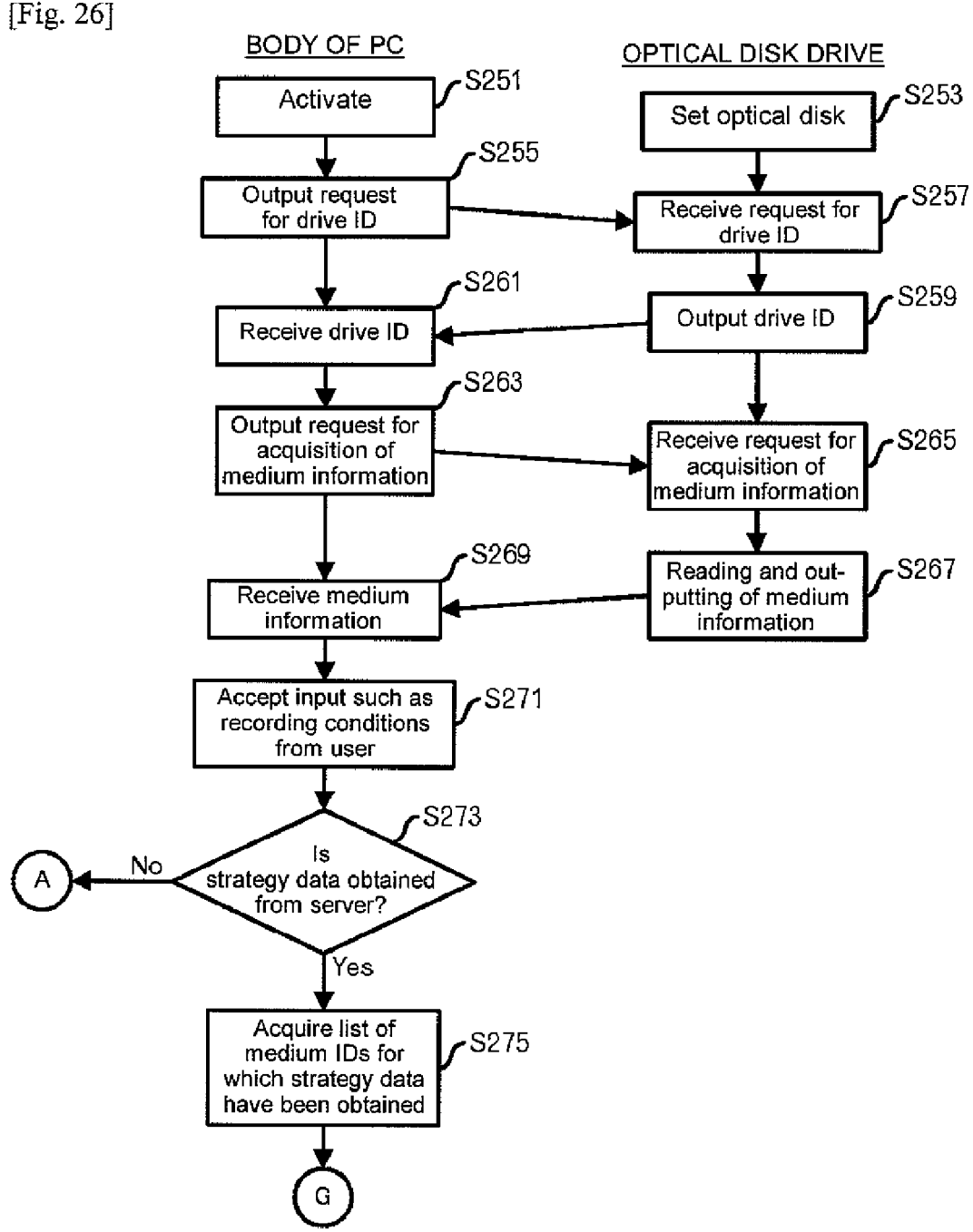

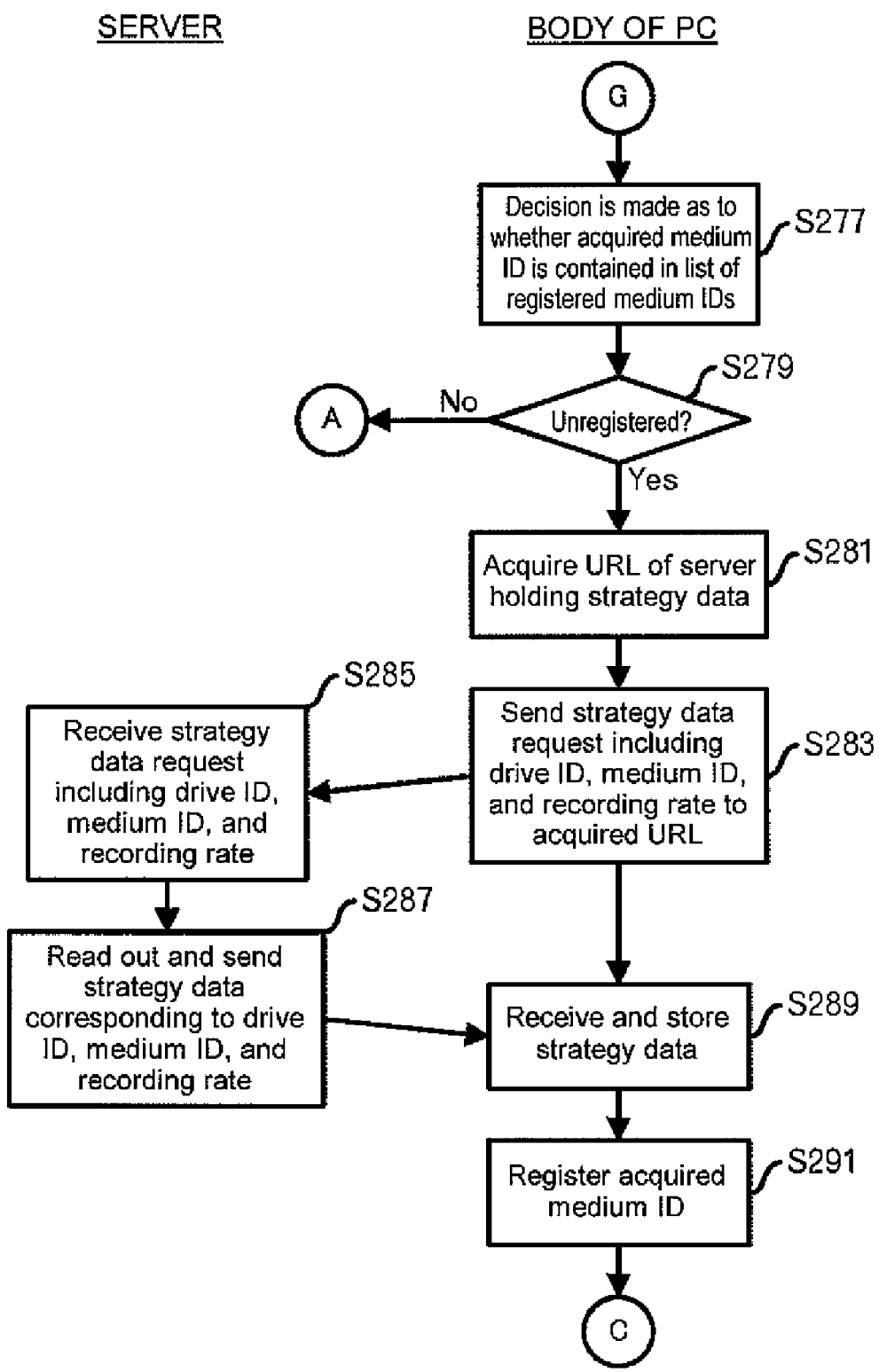
[Fig. 27]

[Fig. 28]
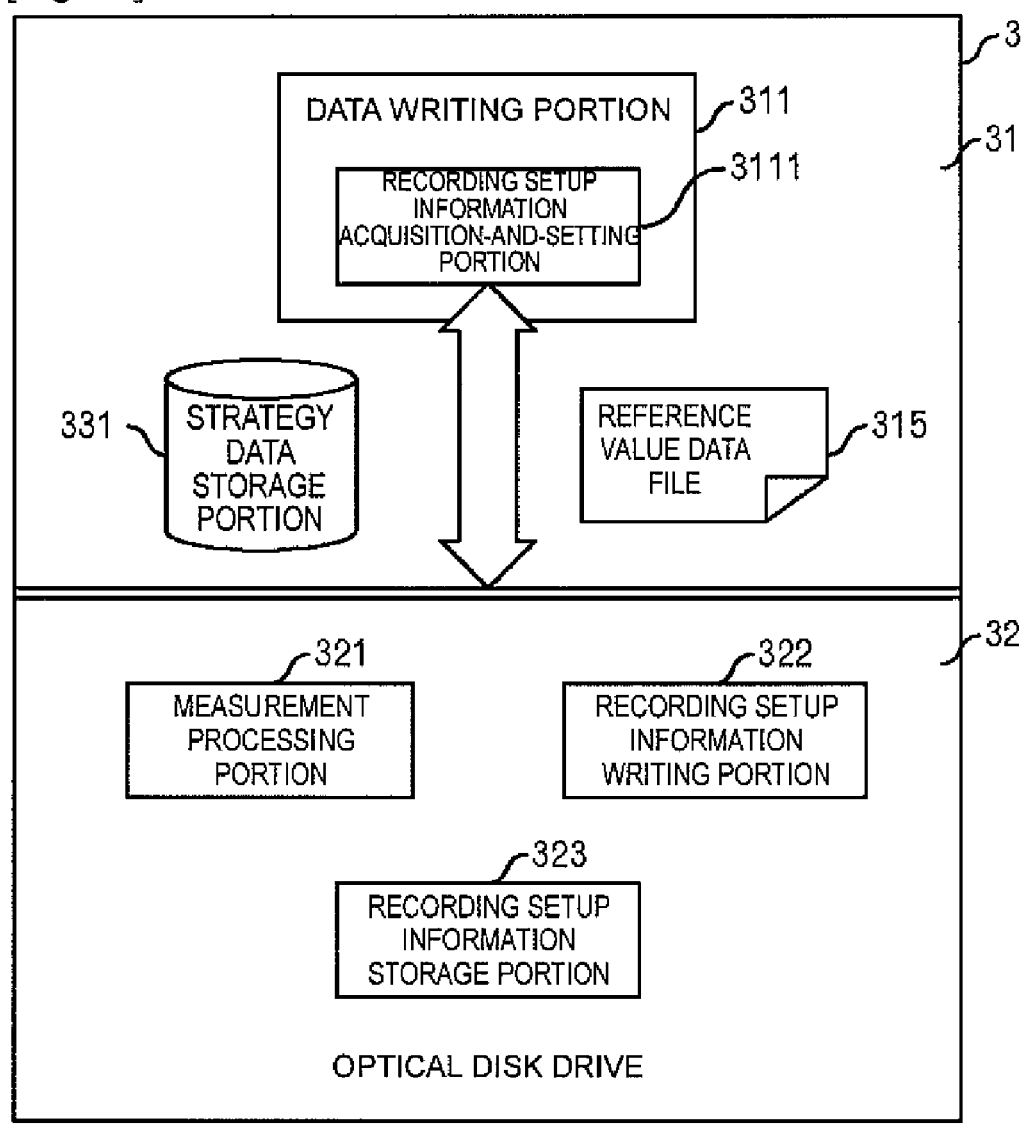

[Fig. 29]
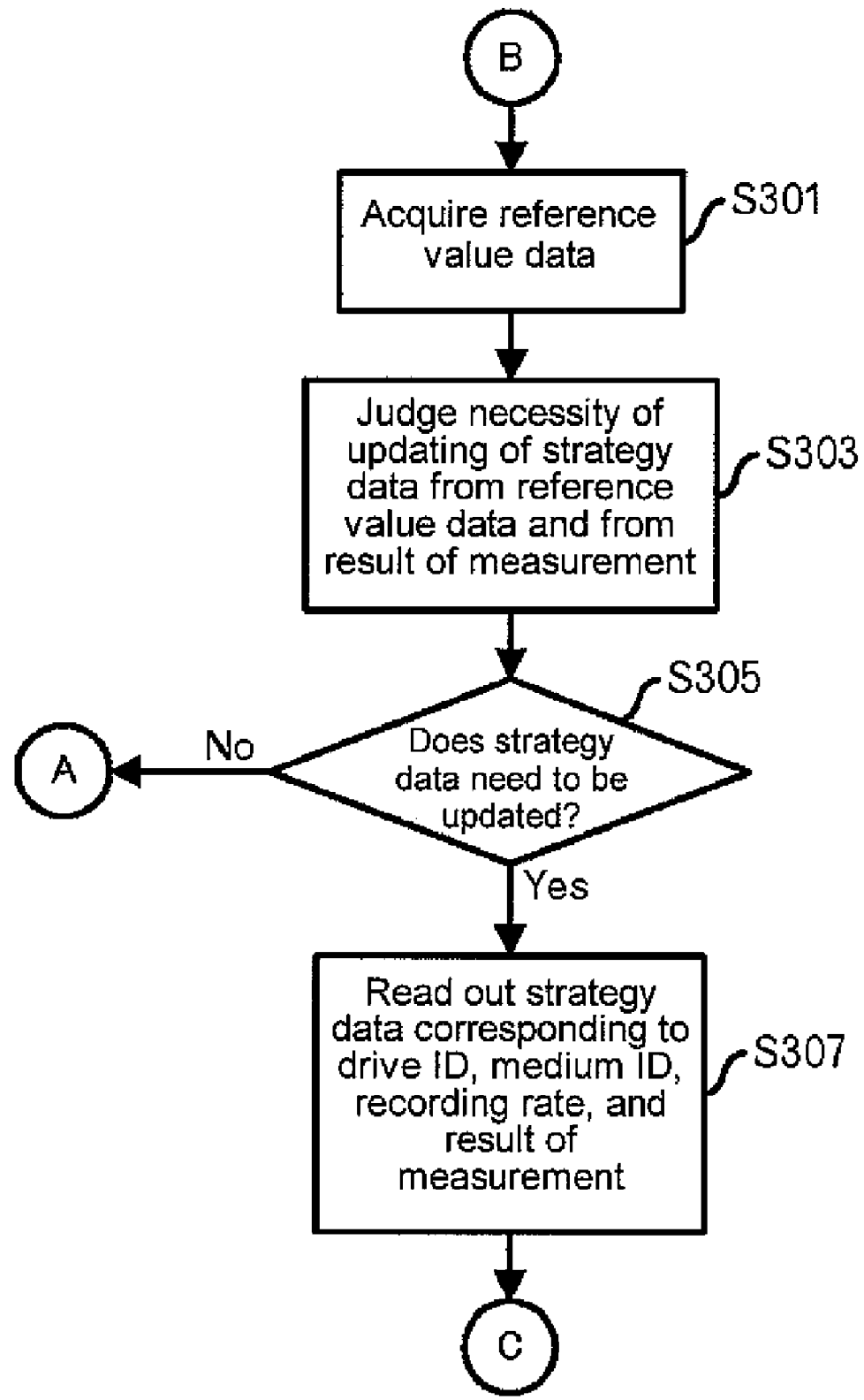

[Fig. 30]
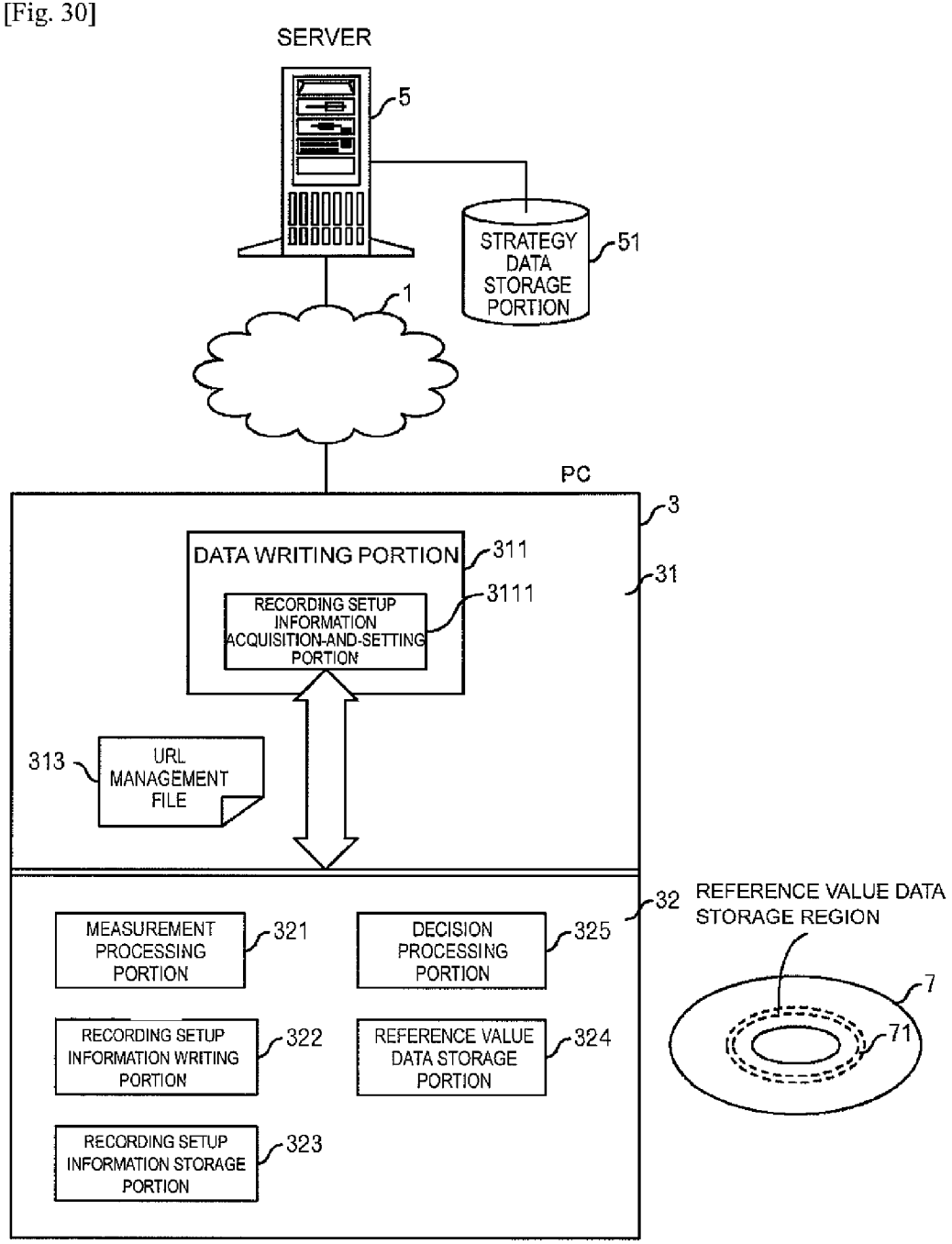

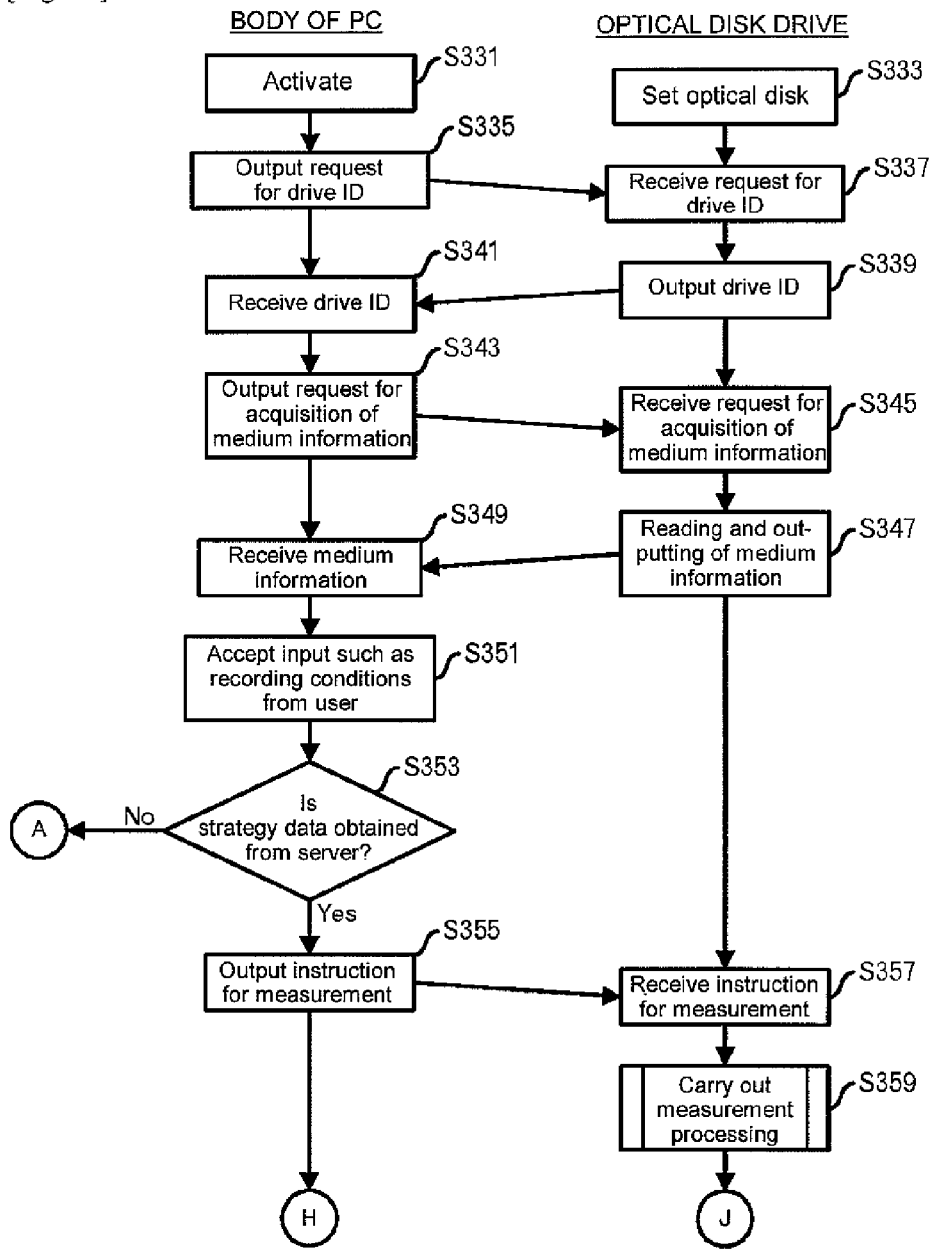
[Fig. 31]

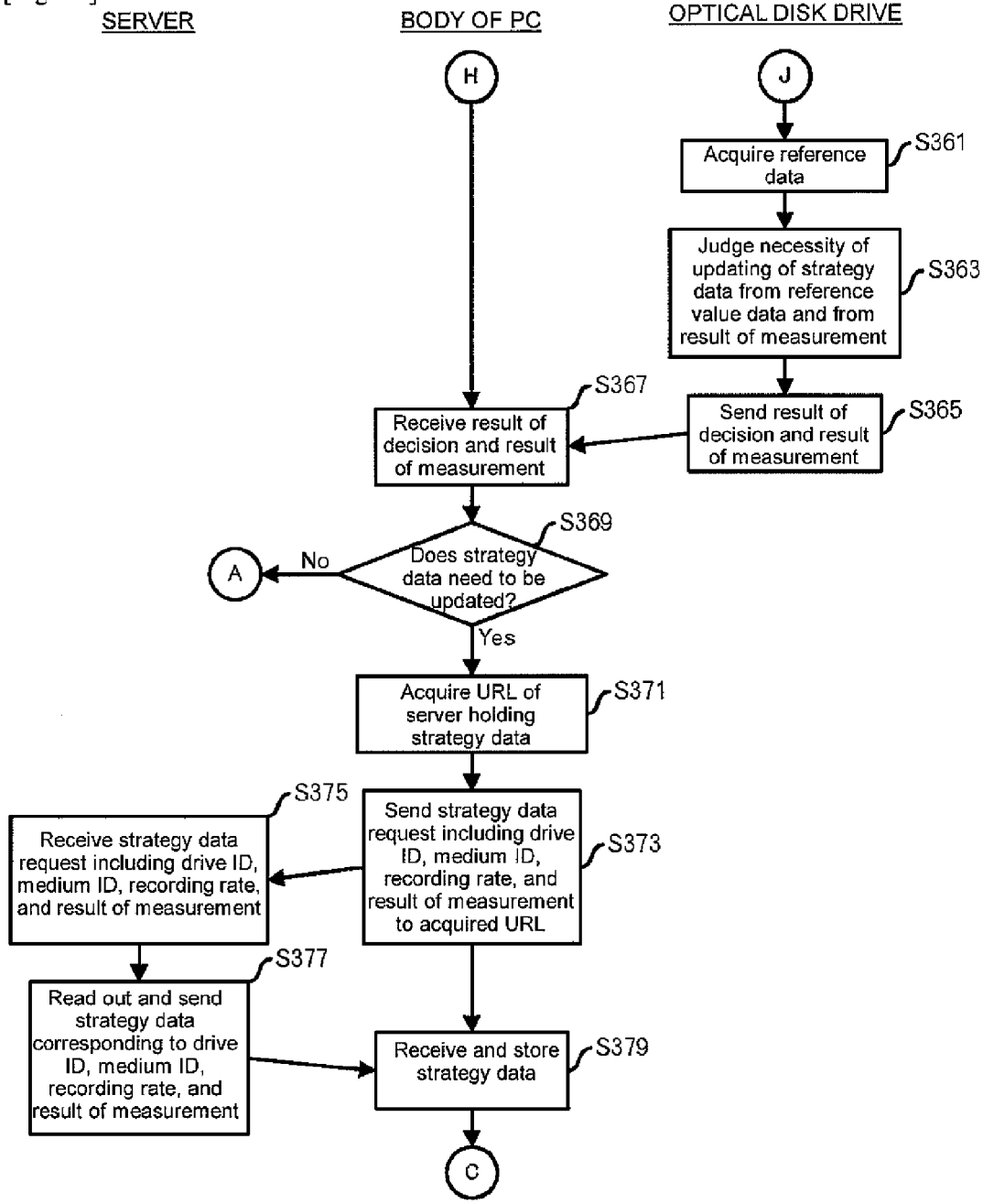

[Fig. 33]
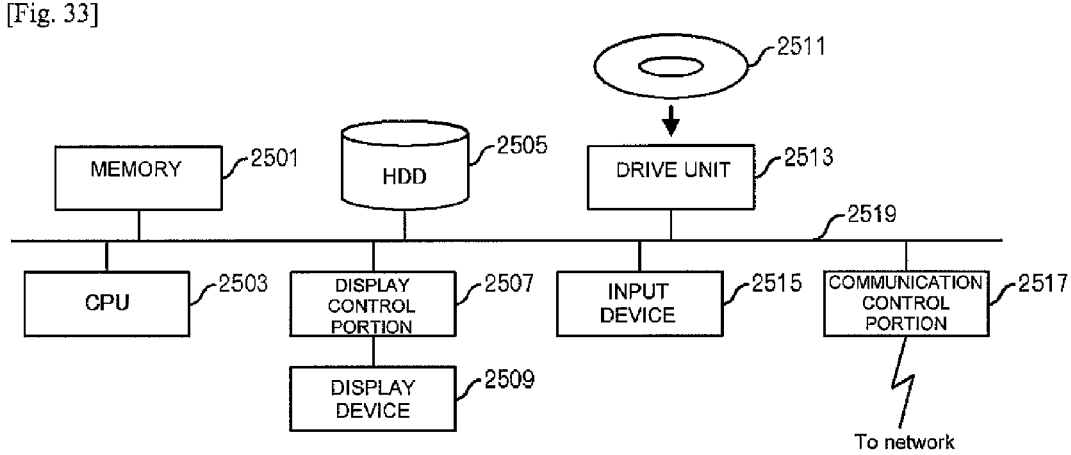

METHOD OF SETTING RECORDING SETUP INFORMATION ABOUT OPTICAL DISK, PROGRAM THEREFOR, AND DATA RECORDING PLAYER

BACKGROUND OF THE INVENTION

1. Field of the Invention

The present invention relates to techniques for acquiring and setting recording setup information used when data is recorded on an optical disk.

2. Description of the Related Art

For example, a technique consisting of acquiring information for specifying a write strategy for an optical recording medium capable of writing data from an external device and writing the data onto the medium in accordance with the write strategy specified by the acquired information is disclosed in JP-A-2003-228836.

Furthermore, a technique permitting information to be read and recorded according to the characteristics of individual recording media is disclosed in JP-A-2005-122840. In particular, an information processor acquires a unique ID from a minidisk having an individual information record area. Information about the characteristics of individual minidisks is managed by a network server. The information processor acquires information about the characteristics corresponding to the minidisk specified by the unique ID from the network server, optimizes the servo characteristics according to the information about the characteristics, and records or reads information.

Setup information for recording on an optical disk such as a write strategy needs information corresponding to the machine type of the optical disk drive for recording and reading, as well as information corresponding to information about the optical disk such as a medium ID, for the following reason. Used parts and circuit design are different among machine types of optical disk drives and, therefore, setup information for recording best adapted for the corresponding machine type is required. Consequently, setup information for recording that corresponds to the medium ID of the optical disk and corresponds to the machine type is previously stored in the optical disk drive. However, as the optical disk drive is used, the laser diode, for example, deteriorates. As a result, the laser power decreases or otherwise ages. Devices managed by the same ID and produced disk media are different among individual products. Furthermore, characteristic differences may be varied due to design alterations. In this way, the setup information for recording best adapted for this machine type may vary. Hence, it has been necessary to acquire new information corresponding to aging of the optical disk drive of this machine type or characteristic differences. According to the related-art techniques as described above, what is disclosed is only to straightforwardly acquire data about the optical disk from an external device. Appropriate data is not obtained at the combination of the optical disk drive and the optical disk. In addition, the present situation is that any appropriate decision is not made as to whether the strategy data must be updated in practice.

SUMMARY OF THE INVENTION

Accordingly, the present invention provides a technique enabling setup information for recording required to perform recording of data on an optical disk to be acquired from an external device as the need arises.

Furthermore, the present invention provides a technique for efficiently acquiring and setting recording setup information required to perform recording of data on an optical disk.

A first method of setting setup information for recording associated with the present invention has the steps of: measuring an evaluation index associated with recording characteristics occurring when data is recorded on an optical disk by an optical disk drive; making a decision as to whether the measured evaluation index is within a tolerable range of setup information for recording, the range being previously set in the optical disk drive; acquiring novel recording setup information corresponding to at least a machine ID of the optical disk drive and a medium ID of the optical disk from outside of the optical disk drive when the evaluation index is judged to be outside the previously set tolerable range of the recording setup information and it has been determined that the recording setup information should be updated; and setting the novel acquired recording setup information in the optical disk drive.

Aging of the optical disk drive can be detected by performing a measurement as described above. The time at which the recording setup information should be updated can be appropriately judged based on the aging. Consequently, updating processing can be performed efficiently. The tolerable range can be defined variously. By making the above-described decision, data can be recorded quickly using the presently held setup information for recording as long as within the tolerable range.

The aforementioned measuring step may involve the step of measuring a signal that is obtained by performing a test recording on the optical disk and reading data recorded by the test recording. If the test recording is performed in this way, an evaluation index approximate to the actual data recording characteristics can be obtained. In consequence, it is possible to make an appropriate decision as to whether the setup information for recording should be updated.

The above-described measuring step may further involve the step of calculating the evaluation index from the result of measurement of the signal. Various evaluation indices can be adopted in embodiments described below where various examples are given. The level of the amplitude of the measured signal needs to be found. In addition, given computations may be required.

Additionally, the above-described measuring step may involve the step of shooting laser light and measuring reflected light without performing the test recording on the optical disk. The measurement can be performed easily and quickly by omitting the test recording.

Moreover, the above-described measuring step may involve the step of calculating the evaluation index from the result of the measurement of the reflected light.

Yet further, the above-described measuring step may involve the step of measuring a temperature in the optical disk drive. Other index may also be measured. Their combination may also be used.

Data stipulating the above-described tolerable range may be read from (i) a storage device in or for the optical disk drive, (ii) a computer storage device connected with the optical disk drive, or (iii) the optical disk. The data stipulating the tolerable range is held in a form ancillary to any one of the optical disk drive, a data writing program, and the optical disk.

The above-described acquiring step may involve the step of making an access to a server holding plural kinds of setup information for recording and downloading novel recording setup information corresponding to at least the machine ID of the optical disk drive and the medium ID of the optical disk.

The newest setup information for recording can be acquired by holding the setup information for recording in the server in this way.

On the other hand, the acquiring step may involve the step of reading novel recording setup information corresponding to at least the machine ID of the optical disk drive and the medium ID of the optical disk from a storage device possessed by a computer connected with the optical disk drive, the storage device holding plural kinds of setup information for recording. Where connection to a network is not made, recording setup information installed ancillarily, for example, to a data writing program can be exploited.

In the acquiring step, recording setup information corresponding to the evaluation index or a gap, or deviance, from a reference value of the evaluation index may be acquired. The recording setup information in closer conformity with the data recording characteristics can be set.

A second method of setting setup information for recording associated with the present invention has the steps of: obtaining state data indicating a state in which data is recorded on an optical disk by an optical disk drive or a state in which recording setup information preset in the optical disk drive is acquired; making a decision as to whether new data recording is within a reference range preset for acquisition of novel recording setup information by referring to a data storage portion in which the state data is stored; acquiring novel recording setup information corresponding to at least a machine ID of the optical disk drive and a medium ID of the optical disk from outside of the optical disk drive if the decision is that the novel data recording is outside the preset reference range; and setting the acquired novel recording setup information in the optical disk drive.

Thus, a state in which novel recording setup information is required is detected, and the information can be updated efficiently.

In some cases, the aforementioned preset range of the reference includes conditions based on the number of data recordings performed. For example, the recording setup information may be updated at a frequency, for example, corresponding to the number of data recordings. In other cases, the range includes conditions regarding the elapsed time from the time of the previous acquisition. For instance, the recording setup information may be updated at cycles of given periods. The range of the reference may be set for each individual medium ID.

The acquiring step may involve the step of making an access to a server holding plural kinds of setup information for recording and downloading novel recording setup information corresponding to at least a machine ID of the optical disk drive and a medium ID of the optical disk from the server. If the setup information for recording is held in the server, the information can be downloaded when the newest data is necessary.

The acquiring step may involve the step of reading novel recording setup information corresponding to at least a machine ID of the optical disk drive and a medium ID of the optical disk from a storage device possessed by a computer connected with the optical disk drive. The storage device holds plural kinds of setup information for recording. Where connection with a network is not made, novel recording setup information installed, for example, ancillarily to a data writing program can be exploited.

It is possible to create a program for causing a computer to implement a method of setting setup information for recording according to the present invention. The program is stored, for example, in an optical disk (e.g., a flexible disk or CD-ROM), a recording medium (e.g., a magneto-optical disk, semiconductor memory, or hard disk), or a storage device. In some cases, the method may be distributed via a network by a digital signal. Data being processed is temporarily stored in a storage device such as a main memory.

According to the present invention, a decision is made as to whether recording setup information necessary to record data on an optical disk is within a tolerance range or within a reference range. When appropriate setup information for recording is necessary, it can be obtained from the outside. Appropriate recording can be made on the optical disk by utilizing the obtained information.

According to another aspect of the present invention, recording setup information necessary to record data on an optical disk can be acquired efficiently and set in a data recording player. Because of this setting, appropriate recording can be made on the optical disk.

BRIEF DESCRIPTION OF THE DRAWINGS

FIG. 1 is a functional block diagram of a system according to a first embodiment of the present invention.

FIG. 2 is a diagram illustrating a data structure in a strategy data storage portion.

FIG. 3 is a diagram illustrating parameters in a multiple pulse form.

FIG. 4 is a diagram illustrating parameters in a non-multiple pulse form.

FIG. 5 is a table illustrating a method of holding strategy data regarding parameter "dTtop".

FIG. 6 is a table illustrating one example of a data set stored in a URL management file.

FIG. 7 is a flowchart illustrating a sequence of processing steps performed according to the first embodiment of the invention.

FIG. 8 is a flowchart illustrating a sequence of processing steps for measurements according to the first embodiment of the invention.

FIG. 9 is a flowchart illustrating a sequence of processing steps according to the first embodiment of the invention.

FIG. 10 is a flowchart illustrating a sequence of processing steps according to the first embodiment of the invention.

FIG. 11 is a flowchart illustrating a sequence of processing steps according to the first embodiment of the invention.

FIG. 12 is a flowchart illustrating a sequence of processing steps for measurements according to a second embodiment of the invention.

FIG. 13 is a functional block diagram of a data recording player according to a third embodiment of the invention.

FIG. 14 is a flowchart illustrating a sequence of processing steps according to the third embodiment of the invention.

FIG. 15 is a table showing one example of a data set stored in an access history management file.

FIG. 16 is a flowchart illustrating a sequence of processing steps according to the third embodiment of the invention.

FIG. 17 is a diagram illustrating a data structure in a strategy data storage portion.

FIG. 18 is a diagram illustrating one example of a data set stored in a medium ID management file.

FIG. 19 is a table showing one example of a data set stored in an access history management file.

FIG. 20 is a functional block diagram of a data recording player according to a fourth embodiment of the invention.

FIG. 21 is a table showing one example of a data set stored in a data recording history management file.

FIG. 22 is a flowchart illustrating a sequence of processing steps according to the fourth embodiment of the invention.

FIG. 23 is a flowchart illustrating a sequence of processing steps according to the fourth embodiment of the invention.

FIG. 24 is a flowchart illustrating a sequence of processing steps according to a fifth embodiment of the invention.

FIG. 25 is a flowchart illustrating a sequence of processing steps according to the fifth embodiment of the invention.

FIG. 26 is a flowchart illustrating a sequence of processing steps according to a sixth embodiment of the invention.

FIG. 27 is a flowchart illustrating a sequence of processing steps according to the sixth embodiment of the invention.

FIG. 28 is a functional block diagram of a data recording player according to a seventh embodiment of the invention.

FIG. 29 is a flowchart illustrating a sequence of processing steps according to the seventh embodiment of the invention.

FIG. 30 is a functional block diagram of a data recording player according to an eighth embodiment of the invention.

FIG. 31 is a flowchart illustrating a sequence of processing steps according to the eighth embodiment of the invention.

FIG. 32 is a flowchart illustrating a sequence of processing steps according to the eighth embodiment of the invention.

FIG. 33 is a functional block diagram of a computer.

DETAILED DESCRIPTION OF PREFERRED EMBODIMENTS

Embodiment 1

A system associated with a first embodiment of the present invention is schematically shown in FIG. 1. At least one personal computer (PC) 3 and at least one server 5 are connected with a network 1, for example the Internet. The server 5 manages a strategy data storage portion 51 in which setup information for various kinds of recording (i.e., strategy data) is stored. The personal computer 3 can be of the desktop type or notebook type. The personal computer 3 has a PC body 31 and an optical disk drive 32 that is a device for recording and reading an optical disk. The disk drive 32 may be integrated with the PC body 31. Alternatively, the disk drive 32 may also be connected externally, for example, by a universal serial bus (USB). Furthermore, the personal computer 3 may be kept connected with the network 1. As the need arises, the computer may be temporarily connected with the network 1.

The body of the personal computer 31 has a data writing portion 311 forming a main portion of the system of the present embodiment, a uniform resource locator (URL) management file 313, and a reference value data file 315. The data writing portion 311 is realized by executing a data writing program associated with the present embodiment by means of the body of the personal computer 31. The data writing portion 311 includes a recording setup information acquisition-and-setting portion 3111.

The optical disk drive 32 has a measurement processing portion 321 for performing measurements to derive a material based on which a decision is made as to whether strategy data should be obtained from the outside, in addition to main functions including data recording function and data reading function. Furthermore, the disk drive 32 has a storage portion 323 for storing setup information for recording used by the data recording function and a writing portion 322 for writing setup information for recording. The writing portion 322 performs processing for storing setup information for recording into the recording setup information storage portion 323 according to an instruction from the recording setup information acquisition-and-setting portion 3111 of the data writing portion 311 of the body of the personal computer 31. In some cases, the optical disk drive 32 may have a reference value data storage portion 324. Data about reference values may be stored in a reference value data storage region 71 of the optical disk 7 and read out by the disk drive 32.

FIG. 2 schematically illustrates the state in which the strategy data stored in the strategy data storage portion 51 is managed, the storage portion 51 being managed by the server 5. The strategy data includes plural parameters (in the example of FIG. 2, only "dTtop" indicative of the head pulse starting position is shown) that are required for combinations of drive IDs, medium IDs, recording rates, and results of measurements (described later). The results of the measurements are the results of measurements themselves, differences of the results of measurements from reference values, or gaps from the reference values. The parameters are in a multi-pulse form as shown in FIG. 3 or a non-multi-pulse form as shown in FIG. 4. For example, where the recording rate is low, the multi-pulse form is adopted. Where the recording rate is high, the non-multi-pulse form is adopted. Alternatively, the non-multi-pulse form is adopted at every recording rate. In the case of the multi-pulse form, the dTop indicating the starting position of the head pulse, Ttop indicating the width of the head pulse, Tmp indicating the width of an intermediate pulse, Tip indicating the width of a final pulse, and dTs indicating the terminal position of a cooling pulse are included. Similarly, in the case of the non-multi-pulse form, dTtop indicating the starting position of the head pulse, LDH indicating the width of the head pulse, TBST indicating the width of the final pulse, dTlast indicating the terminal position of the final pulse, dTs indicating the terminal position of a cooling pulse, and Duty indicating the pulse width corresponding to the length of the created mark are included.

Furthermore, as shown in FIG. 5, with respect to each parameter or some of the parameters, a set value is preferably held by a combination of a recorded mark length and a preceding space length. FIG. 5 shows the case of dTtop. With respect to each of marks starting from 2T and ending with 6T, set values are registered for preceding space lengths from 2T to 5T. A necessary code length is selected according to the standard of the optical disk.

One example of a data set stored in the URL management file 313 is shown in FIG. 6. In the example of FIG. 6, the URL of the server 5 is registered for each medium ID. However, where only one server 5 is prepared for the network 1, only the URL of the server 5 is registered. In some cases, servers are prepared, for example, for individual optical disk manufacturers, respectively.

Reference values for the results of measurements (described later), threshold values of a tolerable range, or upper and lower limit values stipulating a reference value and a tolerable range from the reference value are stored in the reference value data file 315.

The operation of the system shown in FIG. 1 is next described by referring to FIGS. 7-11. First, the data writing portion 311 is activated, for example, according to an instruction from a user of the personal computer 3 (step S1). The user sets an optical disk, on which new data is to be recorded, at a given position on the axis of the spindle motor of the optical disk drive 32, for example, by inserting the disk into the disk drive 32 (step S3).

The data writing portion 311 of the body of the personal computer 31 outputs a drive ID demand signal to the optical disk drive 32 (step S5). In response to this, the disk drive 32 receives the drive ID demand signal from the data writing portion 311 (step S7). For example, the drive reads a drive ID (machine ID) stored in the memory of the disk drive 32 and outputs the drive ID to the data writing portion 311 (step S9). The data writing portion 311 receives the drive ID from the disk drive 32 and stores it, for example, in a main memory (step S11). Where the drive ID has been already acquired as a data item constituting the personal computer 3 by the operating system (OS), the data writing portion 311 may use the data item instead of obtaining the drive ID using the steps S5-S11.

Furthermore, the data writing portion 311 outputs a medium information acquisition demand signal to the optical disk drive 32 (step S13). The disk drive 32 receives the acquisition demand signal (step S15), reads medium information including a medium ID from the optical disk set in step S3, and outputs the information to the data writing portion 311 (step S17). The data writing portion 311 receives the medium information from the disk drive 32 and stores it, for example, in the main memory (step S19). In some cases, the medium information includes a dedicated code indicating implementation of processing for obtaining strategy data from the server 5. In addition, in order to record the history of use of the optical disk, the medium ID may be registered, for example, in a use history management file, though this is not illustrated in the present embodiment.

The data writing portion 311 may prompt the user to enter an instruction indicating recording conditions (e.g., recording rate) or indicating whether or not strategy data should be gained from the server 5 or whether strategy data should be automatically gained from it. The data writing portion may accept an input (such as recording conditions) from the user (step S21).

The data writing portion 311 makes a decision as to whether strategy data should be obtained from the server 5 (step S23). For example, where an instruction is given from the user in step S21, if a dedicated code as described above is received in step S19, or if it has been confirmed that the personal computer 3 is connected with the network 1, the data writing portion judges that it acquires strategy data from the server 5. In other cases, program control goes to the processing of FIG. 11 via a terminal A.

Where strategy data is obtained from the server 5, the data writing portion 311 outputs a measurement instruction signal to the measurement processing portion 321 of the optical disk drive 32 (step S25). The measurement processing portion 321 of the drive 32 receives the measurement instruction signal from the data writing portion 311 (step S27) and carries out measurements (step S29). Measurements associated with the present embodiment will be described by referring to FIG. 8.

In the present embodiment, laser light is simply directed at one or more locations on the optical disk 7, and the level of the reflected light (returning light) is measured. Accordingly, the measurement processing portion 321 sets reading conditions, for example, for the laser driver (not shown) (step S41), directs reading laser light at the optical disk 7, and detects the level of the light reflected from the disk 7 (step S43). The level of the reflected light is measured in units of mW or as reflectance (%).

The measurement time can be shortened if the level of the reflected light is detected by a simple method as described above and, therefore, it is possible to make a decision quickly as to whether it is necessary to update the strategy data.

Returning to FIG. 7, the measurement processing portion 321 outputs the result of the measurement to the data writing portion 311 of the body of the personal computer 31 (step S31). For example, where the reference value data storage portion 324 is mounted, or where reference value data is read from the reference value data storage region 71 of the optical disk 7, the result of the measurement may contain the reference value data. The recording setup information acquisition-and-setting portion 3111 of the data writing portion 311 receives the result of measurement from the optical disk drive 32 and stores the result, for example, in a storage device such as the main memory (step S33). Program control shifts to the processing of FIG. 9 via a terminal B.

The processing of FIG. 9 is now described. The recording setup information acquisition-and-setting portion 3111 reads reference value data, for example, from the reference value data file 315 (step S51). Where the reference value data is received from the optical disk drive 32, step S51 is omitted. Necessity of updating of the strategy data may be judged from the reference value data and from the result of measurement (step S53). For example, a decision is made as to whether the result of measurement is contained within a tolerable range, using a reference value as well as an upper limit value (e.g., $+\alpha\%$ or in mV) and a lower limit value (e.g., $-\beta\%$ or in mV) stipulating the tolerable range from the reference value. Alternatively, no reference value may be used, and the decision as to whether the result of measurement is contained within the tolerable range may be made, simply based on the upper and lower limit values stipulating the tolerable range. Still alternatively, a tolerable range may be defined, and ranges are defined outside the tolerable range. A decision may be made as to whether the result of measurement belongs to the first or second range, for example, that is outside the tolerable range. Moreover, $\alpha$ or $\beta$ may be equal to 0.

Where the result of measurement is within the tolerable range and it is not necessary to update the strategy data (i.e., the NO branch is taken at step S55), program control proceeds to the processing of FIG. 11 via the terminal A. On the other hand, where the result of measurement is outside the tolerable range and it is necessary to update the strategy data (i.e., the YES branch is taken at step S55), the recording setup information acquisition-and-setting portion 3111 reads the URL of the server 5 holding the strategy data, for example, from the URL management file 313 (step S57). The URL of the server 5 may be managed by the body of the personal computer 31 or stored in the memory of the optical disk drive 32. In the latter case, the URL is received from the disk drive 32, for example, together with medium information.

Then, the recording setup information acquisition-and-setting portion 3111 sends the strategy data demand signal to the URL of the server 5 obtained in step S57 via the network 1 (step S59). The strategy data demand signal includes the drive ID acquired in step S1, the medium ID acquired in step S19, a recording rate, for example as obtained in step S21, and the result of measurement obtained in step S33 (e.g., the measurement, the difference from the reference value, or gap from the reference value, the range to which the result of measurement belongs outside the tolerable range (for example, as to whether the upper limit value is exceeded or the lower limit value is not reached)). Where access to the server 5 is limited, for example, by membership, processing for a log-in is performed and then step S59 is carried out.

If the strategy data demand signal including the drive ID, the medium ID, the recording rate, and the result of measurement is received from the personal computer 3 (step S61), the server 5 searches the strategy data storage portion 51 by the received drive ID, medium ID, recording rate, and result of measurement, reads out some or all pertinent strategy data items, and sends them to the requesting personal computer 3 (step S63). The recording setup information acquisition-and-setting portion 3111 of the data writing portion 311 of the personal computer 3 receives the pertinent novel strategy data from the server 5 and once stores the data, for example, into a hard disk drive (step S65). Program control then goes to the processing of FIG. 10 via a terminal C.

The processing of FIG. 10 is now described. The recording setup information acquisition-and-setting portion 3111 outputs a strategy setting command including the novel strategy data received from the server 5 to the optical disk drive 32 (step S69). The recording setup information writing portion 322 of the disk drive 32 receives the strategy setting command including the novel strategy data (step S71) and overwrites the data in the recording setup information storage portion 323 with the strategy data (step S73). Alternatively, existing strategy data (e.g., strategy data set when the optical disk drive was purchased) may be left, and the received novel strategy data may be added.

Thereafter, the optical disk drive 32 reads novel strategy data corresponding to the medium ID read out in step S17 from the recording setup information storage portion 323 and sets the data as the currently used strategy data (step S75). Then, a normal test recording (e.g., optimum recording power control (OPC)) is carried out, and the optimum recording power is determined (step S77). A technique known in the art can be used for this processing and so its detailed description is omitted. The optimum recording power determined in step S77 is set as the currently used recording power (step S79). Thus, preparations for implementation of data recording have been completed.

Subsequently, the recording setup information writing portion 322 of the optical disk drive 32 informs the data writing portion 311 of the body of the personal computer 31 of completion of setting of the recording power (step S81). When the data writing portion 311 receives the notification of completion of setting of the recording power from the disk drive 32 (step S83), the writing portion outputs data to be recorded to the disk drive 32 (step S85). The drive 32 receives the data to be recorded from the body of the personal computer 31 and carries out data recording according to the setting made as described above (step S87).

Processing performed when novel strategy data is not obtained from the server 5, i.e., the processing downstream of the terminal A, is described by referring to FIG. 11. In this case, the data writing portion 311 gives an instruction for making preparations for recording to the disk drive 32 (step S91). On receiving the signal indicating preparations for recording from the body of the personal computer 31 (step S93), the optical disk drive 32 reads strategy data corresponding to the medium ID read out in step S17 from the recording setup information storage portion 323 and sets the data as the currently used strategy data (step S95). The normal test recording (e.g., optimum power control) is performed, and the optimum recording power is determined (step S97). Since a technique known in the art can be used for this processing, its detailed description is omitted. The optimum recording power determined in step S97 is set as the currently used recording power (step S99). Thus, preparations for implementation of the data recording are completed.

Subsequently, the optical disk drive 32 informs the data writing portion 311 of the body of the personal computer 31 of the completion of setup of the recording power (step S101). On receiving the notification of the completion of the setting of the recording power from the optical disk drive 32 (step S103), the data writing portion 311 outputs data to be recorded to the disk drive 32 (step S105). The drive 32 receives the recorded data from the body of the personal computer 31 and carries out a test recording according to the setting made as described previously (step S107).

The implementation of the processing as described so far makes it possible to gain appropriate strategy data from an external device in a case where the level of the light reflected from the optical disk 7 is outside the tolerable range, i.e., when it is known that if data is recorded on the optical disk 7 based on the normal strategy data by the optical disk drive 32, the combination will induce problems. Consequently, appropriate data recording can be made. Especially, strategy data is acquired after making a simple decision as to whether the current recording of data is likely to produce problems. Therefore, where problems do not occur, recording of data can be started quickly.

In the above embodiment, an example in which strategy data is obtained from the server 5 is given. In some cases, power control information may be included. The power control information may include conditions of the optimum power control performed in step S77. The OPC conditions may contain (1) set values of Pw, Pbw, Ps, Pc, and Pm shown in FIGS. 3 and 4 at the time of test recording and (2) a reference value based on which an optimum power is judged.

In the case (1), the conditions of the main power (Pw) include plural set values or one reference set value plus given change conditions for the reference set value. Conditions other than the main power include given coefficients (e.g., calculated, for example, using $Pbw=Pw=\epsilon Pbw$, from $\epsilon Pbw$, $\epsilon Ps$, $\epsilon Pc$, $\epsilon Pm$, and so on) regarding the main power (Pw). Where calculation is performed using $Pbw=Pw=\epsilon Pbw+\alpha$, an offset value $\alpha$ may be included.

In the case (2), a target value is included for each medium ID. For example, where the medium is a DVD, a $\beta$ value is included. Where the medium is a Blu-ray disc, an asymmetric target value is included. Another example is that parameters ($\kappa$, Pind, Mind, $\rho$, and so on) of extrapolation conditions from a curve of percentage modulation for the main power (Pw) are included.

The power control information can be used either in WOPC (walking OPC) consisting of halting the recording operation, adjusting the recording power, and then resuming the recording or in ROPC (running OPC) consisting of adjusting the recording power concurrently with the recording operation without stopping the recording operation, The power control information may include (1) measured values ($\beta$ value, asymmetry value, voltage level value, and so on) corresponding to the recording rate conditions or the amount by which the recording power is adjusted in a corresponding manner to the amount of difference between the measured value and the target value (e.g., a table of amounts by which the recording power is adjusted or a derivation equation), (2) a set value of recording power (a set table or derivation equation) corresponding to the recording rate conditions, or (3) a reference value of the optimum recording power corresponding to the recording rate conditions, for example.

Furthermore, in the above embodiment, strategy data corresponding to the medium ID acquired in step S19 is acquired. For example, when an access to the server 5 is being made, strategy data corresponding to the medium ID either of the optical disk 7 on which data was recorded or of the optical disk 7 on which data is recorded frequently may be obtained.

In the above embodiment, an example in which processing is performed using the level of reflected light as a result of measurement is given. The processing can be modified to processing in which a decision is made based on an index value (e.g., the camber angle of the optical disk 7, a push-pull value, or the amplitude of a servo error signal) determined, for example, based on the level of reflected light.

Embodiment 2

In the first embodiment (Embodiment 1), only the level of light reflected from the optical disk 7 is measured after directing laser light at the disk. The level is not a result of actual data recording and may not always precisely represent the characteristics in actual data recording. Accordingly, in the present embodiment, more appropriate strategy data is acquired by performing measurements using characteristics close to the characteristics used in actual data recording, by changing the measurement processing (FIG. 8) in step S29 to the processing of FIG. 12. The system configuration itself of Embodiment 2 is the same as that of the first embodiment shown in FIG. 1.

The measurement processing portion 321 of the optical disk drive 32 sets recording conditions for the present measurement for the laser driver (step S111) and performs a test recording (step S113). Normally, data is recorded in a test recording region of the optical disk 7. The data may also be recorded in a data recording region. With respect to the recording conditions, a single given recording power is set. For more detailed measurements, plural levels of recording powers may be set, and a measurement may be made at each level of recording power.

Then, reproduction conditions are set for the laser driver (step S115). Laser light is shot under the reproduction conditions, and the level of the reflected light (returning light) is measured (step S117). A desired evaluation index is calculated as a measurement result using the level of the reflected light (step S119).

Various indices including (1) asymmetry, (2) β value, (3) DC jitter, (4) error rate, and (5) percentage modulation can be used as a desired evaluation index. The asymmetry is an index indicating asymmetry between short and long codes in a modulation scheme used in each medium standard. This index is effective in evaluating the state of recording straightforwardly. The β value and percentage modulation are also well-known indices known in the art, and are calculated based on the level of the amplitude of the reproduced signal. The DC jitter is an index overall indicating an amount of variation of lengths of various codes such as marks and spaces in the modulation scheme used in each medium standard. This index is effective in evaluating the state of recording. The error rate is also an index indicating the quality of the reproduced signal. Other conventional indices may also be used.

The values (including reference value data in a case where the reference value data storage portion 324 is mounted) of the evaluation indices calculated in this way are output as a measurement result to the recording setup information acquisition-and-setting portion 3111 of the data writing portion 311. A decision is made as to whether the value of each index is within or outside a tolerable range, based on the relationship with the reference value data.

Thus, a decision can be made based on the result of measurement in better agreement with the actual situations than the first embodiment as to whether or not strategy data should be obtained.

Embodiment 3

FIG. 13 schematically shows a system associated with the present embodiment. At least one computer (PC) 3 and at least one server 5 are connected with a network 1, for example the Internet. The server 5 manages a strategy data storage portion 51 in which various kinds of strategy data are stored. This fundamental structure is similar to that of the first embodiment.

The body of the personal computer 31 has a data writing portion 311, a URL management file 313, and an access history management file 317. The data writing portion 311 is a main portion of the present embodiment. In some cases, the body 31 may include a medium ID management file 318. The data writing portion 311 is realized by executing a data writing program associated with the present embodiment by the body of the personal computer 31. The data writing portion 311 includes a recording setup information acquisition-and-setting portion 3111 of the data writing portion 311 of the body of the personal computer 31.

The optical disk drive 32 has a recording setup information storage portion 323 for storing recording setup information used by the data recording function, in addition to main functions including data recording function and data reading function. Furthermore, the disk drive 32 has a recording setup information writing portion 322 for performing processing for storing recording setup information into the recording setup information storage portion 323 according to an instruction from the recording setup information acquisition-and-setting portion 3111.

The operation of the system shown in FIG. 13 is next described by referring to FIGS. 14-16. First, the data writing portion 311 is activated, for example, according to an instruction from the user of the personal computer 3 (step S121). The user sets an optical disk, on which new data is to be recorded, at a given position on the axis of the spindle motor of the optical disk drive 32, for example, by inserting the disk into the disk drive 32 (step S123).

The data writing portion 311 of the body of the personal computer 31 outputs a drive ID demand signal to the optical disk drive 32 (step S125). In response to this, the disk drive 32 receives the drive ID demand signal from the data writing portion 311 (step S127). For example, the drive reads a drive ID stored in the memory of the disk drive 32 and outputs the drive ID to the data writing portion 311 (step S129). The data writing portion 311 receives the drive ID from the disk drive 32 and stores it, for example, in a main memory (step S131). Where the drive ID has been already acquired as a data item constituting the personal computer 3 by the operating system (OS), the data writing portion 311 may use the data item instead of obtaining the drive ID using the steps S125-S131.

Furthermore, the data writing portion 311 outputs a medium information acquisition requesting signal to the optical disk drive 32 (step S133). The disk drive 32 receives the acquisition requesting signal (step S135), reads medium information including a medium ID from the optical disk set in step S123, and outputs the information to the data writing portion 311 (step S137). The data writing portion 311 receives the medium information from the disk drive 32 and stores it, for example, in the main memory (step S139). In some cases, the medium information includes a dedicated code indicating implementation of processing for obtaining strategy data from the server 5.

The data writing portion 311 may prompt the user to enter an instruction indicating recording conditions (e.g., recording rate) or indicating whether or not strategy data should be gained from the server 5 or whether strategy data should be automatically gained from it. The data writing portion may accept an input (such as recording conditions) from the user (step S141).

The data writing portion 311 makes a decision as to whether strategy data should be obtained from the server 5 (step S143). For example, where an instruction is given from the user in step S141, if a dedicated code as described above is received in step S139, or if it has been confirmed that the computer is connected with the network 1, the data writing portion judges that it acquires strategy data from the server 5. In other cases, program control goes to the processing of FIG. 11 via a terminal A.

Where strategy data is obtained from the server 5, the recording setup information acquisition-and-setting portion 3111 of the data writing portion 311 reads out the date and time at which the access history management file 317 accessed the server 5 the previous time (i.e., the date and time at which the previous access was made) (step S145). Data as shown in FIG. 15 is stored in the access history management file 317. That is, historical data about the history of access dates and times have been accumulated. The newest access date and time (200705241640 in the example of FIG. 15) is read out. Program control proceeds to the processing of FIG. 16 via a terminal D.

The processing of FIG. 16 is now described. The recording setup information acquisition-and-setting portion 3111 obtains the present time, for example, from the system clock and makes a decision as to whether a given time has passed since the date and time of the previous access, i.e., whether within a reference range (step S147). If the decision is that the given time has not passed since the date and time of the previous access (i.e., within the reference range), it is determined that it is not necessary to obtain novel strategy data. Program control then proceeds to the processing of FIG. 11 via the terminal A. Description of processing subsequent to the processing of FIG. 11 is omitted.

On the other hand, if the decision at step S147 is negative (No), i.e., the given time has passed since the date and time of the previous access (that is, outside the reference range), the recording setup information acquisition-and-setting portion 3111 reads the URL of the server 5 holding strategy data, for example, from the URL management file 313 (step S149). In some cases, the URL of the server 5 is managed by the body of the personal computer 31. In other cases, the URL is stored in the memory of the optical disk drive 32, and the URL is received from the disk drive 32, for example, together with medium information.

Then, the recording setup information acquisition-and-setting portion 3111 sends strategy data demand signal to the URL of the server 5 obtained in step S149 via the network 1 (step S151). The strategy data demand signal includes the drive ID obtained in step S131, medium ID obtained in step S139, and a recording rate, for example as obtained at step S141. Where access to the server 5 is limited, for example, by membership, processing for a log-in is performed and then step S151 is carried out.

On receiving the strategy data demand signal including the drive ID, medium ID, and recording rate from the personal computer 3 (step S153), the server 5 searches the strategy data storage portion 51 by the received drive ID, medium ID, recording rate, reads out all pertinent strategy data items, and sends them to the requesting personal computer 3 (step S155). In the present embodiment, the strategy data is held with the data structure as shown in FIG. 17. That is, the strategy data includes plural parameters required for combinations of drive IDs, medium IDs, and recording rates. In the example of FIG. 17, only dTtop is shown. The recording setup information acquisition-and-setting portion 3111 of the data writing portion 311 of the body of the personal computer 3 receives pertinent novel strategy data from the server 5 and once stores the data, for example, into a hard disk drive (step S157). The date and time of the present access is registered in the access history management file 317 (step S159). Program control proceeds to the processing of FIG. 10 via the terminal C. Description of the processing performed after the processing of FIG. 10 is omitted.

In step S151, the medium ID of the optical disk 7 which is registered, for example, in the medium ID management file 318 and which was used in the past may be sent together with the medium ID obtained in step S139. Alternatively, data as shown in FIG. 18 may be held in the medium ID management file 318, and optical disks 7 used frequently in the past may be extracted. In FIG. 18, the number of uses, the date and time of the previous use, and orders determined according to the number of uses are registered for each medium ID, and processing may be performed to extract the top five medium IDs, for example. Where strategy data is obtained for plural medium IDs, servers 5 of access destinations may be different. Therefore, steps S151-S157 are performed for each server. Items of strategy data corresponding to medium IDs other than the medium ID of the currently used optical disk 7 may be written into the recording setup information storage portion 323 of the optical disk drive 32. Alternatively, the items of the strategy data may be once held in the memory of the body of the personal computer 31.

The access history management file 317 is not limited to a simple file as shown in FIG. 15. If the date or time of the previous access is managed for each medium ID as shown in FIG. 19, the newest appropriate strategy data can be obtained from the server 5 at better timing.

When the processing described so far is performed, an access is made to the server 5 in cases where a considerable time has passed since the time of previous updating and it is highly likely that the newest strategy data has been registered. Consequently, it is expected that the number of wasteful accesses to the server 5 will be reduced.

Embodiment 4

A system associated with the present embodiment is schematically shown in FIG. 20. This system is similar to the system shown in FIG. 13 and built in accordance with the third embodiment except that a data recording history management file 319 is introduced instead of the access history management file 317.

Dates and times at which data were recorded and the presence or absence of access to the server 5 at those times, for example, as shown in FIG. 21 are registered in the data recording history management file 319.

The operation of the system shown in FIG. 20 is next described by referring to FIGS. 22-23. First, the data writing portion 311 is activated, for example, according to an instruction from the user of the personal computer 3 (step S161). The user sets an optical disk, on which data is to be recorded at this time, at a given position on the axis of the spindle motor of the optical disk drive 32, for example, by inserting the disk into the disk drive 32 (step S163).

The data writing portion 311 of the body of the personal computer 31 outputs a drive ID demand signal to the optical disk drive 32 (step S165). In response to this, the disk drive 32 receives the drive ID demand signal from the data writing portion 311 (step S167). For example, the drive reads a drive ID stored in the memory of the disk drive 32 and outputs the drive ID to the data writing portion 311 (step S169). The data writing portion 311 receives the drive ID from the disk drive 32 and stores it, for example, in a main memory (step S171). Where the drive ID has been already acquired as a data item constituting the personal computer 3 by the operating system (OS), the data writing portion 311 may use the data item instead of obtaining the drive ID using the steps S165-S171.

Furthermore, the data writing portion 311 outputs a medium information acquisition demand signal to the optical disk drive 32 (step S173). The disk drive 32 receives the acquisition demand signal (step S175), reads medium information including a medium ID from the optical disk set in step S163, and outputs the information to the data writing portion 311 (step S177). The data writing portion 311 receives the medium information from the disk drive 32 and stores it, for example, in the main memory (step S179). In some cases, the medium information includes a dedicated code indicating implementation of processing for obtaining strategy data from the server 5.

The data writing portion 311 may prompt the user to enter an instruction indicating recording conditions (e.g., recording rate) or indicating whether or not strategy data should be gained from the server 5 or whether strategy data should be automatically gained from it. The data writing portion may accept an input (such as recording conditions) from the user (step S181).

The data writing portion 311 makes a decision as to whether strategy data should be obtained from the server 5 (step S183). For example, where an instruction is given from the user in step S181, if a dedicated code as described above is received in step S179, or if it has been confirmed that the computer 3 is connected with the network 1, the data writing portion judges that it acquires strategy data from the server 5. In other cases, program control goes to the processing of FIG. 11 via the terminal A. Description of the processing of FIG. 11 is omitted.

Where strategy data is obtained from the server 5, the recording setup information acquisition-and-setting portion 3111 of the data writing portion 311 reads data recording history data from the data recording history management file 319 (step S185). Program control goes to the processing of FIG. 23 via a terminal E.

The processing of FIG. 23 is now described. The recording setup information acquisition-and-setting portion 3111 makes a decision from the data recording history data acquired in step S185 as to whether predetermined conditions are satisfied within a reference range (step S187). For example, the conditions are as to whether one access was made to the server 5 at every five data recordings. In particular, the conditions are as to whether any access was made to the server 5 at the latest four data recordings. The conditions may also be as to whether one access was made to the server 5 at five data recordings within one month. In particular, where at least one access was made within one month and plural data recordings were made in one month, the conditions are as to whether one access is made at every five recordings. If the decision is negative (No) (i.e., the data recording history data does not satisfy the conditions (that is, within the reference range)) (step S187), the present data recording is registered in the data recording history management file 319 (step S188). Program control then goes to the processing of FIG. 11 via the terminal A without making an access to the server 5. Description of the processing performed subsequently to the processing of FIG. 11 is omitted.

Meanwhile, if the decision at step S187 is affirmative (Yes) (i.e., the data recording history data satisfies the conditions (that is, outside the reference range)), the recording setup information acquisition-and-setting portion 3111 reads the URL of the server 5 holding the strategy data, for example, from the URL management file 313 (step S189). The URL of the server 5 may be managed by the body of the personal computer 31 or stored in the memory of the optical disk drive 32. In the latter case, the URL is received from the disk drive 32, for example, together with medium information.

Then, the recording setup information acquisition-and-setting portion 3111 sends the strategy data demand signal to the URL of the server 5 obtained in step S189 via the network 1 (step S191). The strategy data demand signal includes the drive ID acquired in step S171, the medium ID acquired in step S179, and the recording rate obtained in step S181. Where access to the server 5 is limited, for example, by membership, processing for a log-in is performed and then step S191 is carried out.

If the strategy data demand signal including the drive ID, the medium ID, and a recording rate, for example as obtained in step S181, is received from the personal computer 3 (step S193), the server 5 searches the strategy data storage portion 51 by the received drive ID, medium ID, and recording rate, reads out all pertinent strategy data items, and sends them to the requesting personal computer 3 (step S195). In the present embodiment, the strategy data is held with the data structure as shown in FIG. 17. The recording setup information acquisition-and-setting portion 3111 of the data writing portion 311 of the personal computer 3 receives the pertinent novel strategy data from the server 5 and once stores the data, for example, into a hard disk drive (step S197). The date and time of the data recording made at this time and information indicating whether an access was made to the server 5 are registered in the data recording history management file 319 (step S199). Program control then goes to the processing of FIG. 10 via the terminal C. Description of the processing performed subsequently to the processing of FIG. 10 is omitted.

Thus, frequent accesses to the server 5 are avoided. The newest strategy data can be obtained from the server 5 at appropriate intervals.

In the same way as in the third embodiment, strategy data may be obtained regarding the medium IDs of optical disks 7 used heretofore or regarding the medium IDs of other optical disks 7 used frequently, as well as the medium ID obtained in step S179.

Embodiment 5

A system associated with the present embodiment is similar in configuration with the system of the first embodiment shown in FIG. 1 showing the system. Therefore, description of the system of Embodiment 5 is omitted. However, it is to be noted that those components indicated by the same reference numerals as in FIG. 1 may operate differently.

The contents of processing associated with the present embodiment are described by referring to FIGS. 24 and 25, as well as to FIG. 1. First, the data writing portion 311 is activated, for example, according to an instruction from the user of the personal computer 3 (step S201). The user sets an optical disk, on which new data is to be recorded at this time, at a given position on the axis of the spindle motor of the optical disk drive 32, for example, by inserting the disk into the disk drive 32 (step S203).

The data writing portion 311 of the body of the personal computer 31 outputs a drive ID demand signal to the optical disk drive 32 (step S205). In response to this, the disk drive 32 receives the drive ID demand signal from the data writing portion 311 (step S207). For example, the drive reads a drive ID (machine ID) stored in the memory of the disk drive 32 and outputs the drive ID to the data writing portion 311 (step S209). The data writing portion 311 receives the drive ID from the disk drive 32 and stores it, for example, in a main memory (step S211). Where the drive ID has been already acquired as a data item constituting the personal computer 3 by the operating system (OS), the data writing portion 311 may use the data item instead of obtaining the drive ID using the steps S205-S211.

Furthermore, the data writing portion 311 outputs a medium information acquisition demand signal to the optical disk drive 32 (step S213). The disk drive 32 receives the acquisition demand signal (step S215), reads medium information including a medium ID from the optical disk set in step S203, and outputs the information to the data writing portion 311 (step S217). The data writing portion 311 receives the medium information from the disk drive 32 and stores it, for example, in the main memory (step S219). In some cases, the medium information includes a dedicated code indicating implementation of processing for obtaining strategy data from the server 5.

The data writing portion 311 may prompt the user to enter an instruction indicating recording conditions (e.g., recording rate) or indicating whether or not strategy data should be gained from the server 5 or whether strategy data should be automatically gained from it. The data writing portion may accept an input (such as recording conditions) from the user (step S221).

The data writing portion 311 makes a decision as to whether strategy data should be obtained from the server 5 (step S223). For example, if an instruction is given from the user in step S221, if a dedicated code as described above is received in step S219, or if it has been confirmed that the computer is connected with the network 1, the data writing portion judges that it acquires strategy data from the server 5. In other cases, program control goes to the processing of FIG. 11 via the terminal A.

Where strategy data is obtained from the server 5, the data writing portion 311 outputs a measurement instruction signal to the measurement processing portion 321 of the optical disk drive 32 (step S225). The measurement processing portion 321 of the drive 32 receives the measurement instruction signal from the data writing portion 311 (step S227) and performs a measurement of temperature of the optical disk drive 32 (step S229). For example, the value of the temperature is obtained from a sensor placed in a given position on the optical disk drive 32. The measurement processing portion 321 outputs the result of the measurement to the data writing portion 311 of the body of the personal computer 31 (step S231). For example, where the reference value data storage portion 324 is mounted, or where reference value data is read from the reference value data storage region 71 of the optical disk 7, the result of the measurement may contain the reference value data. The recording setup information acquisition-and-setting portion 3111 of the data writing portion 311 receives the result of measurement from the optical disk drive 32 and stores the result, for example, in a storage device such as the main memory (step S233). Program control proceeds to the processing of FIG. 25 via the terminal F.

The processing of FIG. 25 is now described. The recording setup information acquisition-and-setting portion 3111 reads reference value data, for example, from the reference value data file 315 (step S235). Where the reference value data is received from the optical disk drive 32, step S235 is omitted. Necessity of updating of the strategy data is judged from the reference value data and from the result of measurement (step S237). For example, a decision is made as to whether the measured temperature is contained within a tolerable range, using upper and lower limits of temperature stipulating the tolerable range from a reference value as well as the reference value. Alternatively, no reference value may be used, and the decision as to whether the measured temperature is contained within the tolerable range may be made, simply based on the upper and lower limits of temperature stipulating the tolerable range. Still alternatively, a tolerable range may be defined, and ranges are defined outside the tolerable range. A decision may be made as to whether the result of measurement belongs to the first or second range, for example, that is outside the tolerable range.

Where the measured temperature is within the tolerable range and it is not necessary to update the strategy data (i.e., the decision at step S239 is negative (No)), program control proceeds to the processing of FIG. 11 via the terminal A. On the other hand, where the result of measurement is outside the tolerable range and it is necessary to update the strategy data (i.e., the decision at step S239 is affirmative (Yes)), the recording setup information acquisition-and-setting portion 3111 reads the URL of the server 5 holding the strategy data, for example, from the URL management file 313 (step S241). The URL of the server 5 may be managed by the body of the personal computer 31 or stored in the memory of the optical disk drive 32. In the latter case, the URL is received from the disk drive 32, for example, together with medium information.

Then, the recording setup information acquisition-and-setting portion 3111 sends the strategy data demand signal to the URL of the server 5 obtained in step S241 via the network 1 (step S243). The strategy data demand signal includes the drive ID acquired in step S211, the medium ID acquired in step S219, the recording rate obtained in step S221, and the result of measurement obtained at step S233 (e.g., the gap of the measured temperature from the reference value, the range to which the measured temperature belongs outside the tolerable range (for example, as to whether the upper limit value is exceeded or the lower limit value is not reached)). Where access to the server 5 is limited, for example, by membership, processing for a log-in is performed and then step S243 is carried out.

If the strategy data demand signal including the drive ID, the medium ID, a recording rate, for example as obtained in step S221, and the result of measurement is received from the personal computer 3 (step S245), the server 5 searches the strategy data storage portion 51 by the received drive ID, medium ID, recording rate, and result of measurement, reads out all pertinent strategy data items, and sends them to the requesting personal computer 3 (step S247). The recording setup information acquisition-and-setting portion 3111 of the data writing portion 311 of the personal computer 3 receives the pertinent novel strategy data from the server 5 and once stores the data, for example, into a hard disk drive (step S249). Program control then goes to the processing of FIG. 10 via the terminal C.

If the temperature is outside the tolerable range, then strategy data corresponding to the temperature is obtained, and a setting is made. Thus, appropriate recording of data can be made.

Embodiment 6

A system associated with the present embodiment is similar to the system shown in FIG. 13 except that a medium ID management file 318 is used but the access history management file 317 is not.

The operation of the system associated with the present embodiment is next described by referring to FIGS. 26-27. First, the data writing portion 311 is activated, for example, according to an instruction from the user of the personal computer 3 (step S251). The user sets an optical disk, on which data is to be recorded this time, at a given position on the axis of the spindle motor of the optical disk drive 32, for example, by inserting the disk into the disk drive 32 (step S253).

The data writing portion 311 of the body of the personal computer 31 outputs a drive ID demand signal to the optical disk drive 32 (step S255). In response to this, the disk drive 32 receives the drive ID demand signal from the data writing portion 311 (step S257). For example, the drive reads a drive ID stored in the memory of the disk drive 32 and outputs the drive ID to the data writing portion 311 (step S259). The data writing portion 311 receives the drive ID from the disk drive 32 and stores it, for example, in a main memory (step S261). Where the drive ID has been already acquired as a data item constituting the personal computer 3 by the operating system (OS), the data writing portion 311 may use the data item instead of obtaining the drive ID using the steps S255-S261.

Furthermore, the data writing portion 311 outputs a medium information acquisition requesting signal to the optical disk drive 32 (step S263). The disk drive 32 receives the acquisition requesting signal (step S265), reads medium information including a medium ID from the optical disk set in step S253, and outputs the information to the data writing portion 311 (step S267). The data writing portion 311 receives the medium information from the disk drive 32 and stores it, for example, in the main memory (step S269). In some cases, the medium information includes a dedicated code indicating implementation of processing for obtaining strategy data from the server 5.

The data writing portion 311 may prompt the user to enter an instruction indicating recording conditions (e.g., recording rate) or indicating whether or not strategy data should be gained from the server 5 or whether strategy data should be automatically gained from it. The data writing portion may accept an input (such as recording conditions) from the user (step S271).

The data writing portion 311 makes a decision as to whether strategy data should be obtained from the server 5 (step S273). For example, where an instruction is given from the user in step S271, if a dedicated code as described above is received in step S269, or if it has been confirmed that the personal computer 3 is connected with the network 1, the data writing portion judges that it acquires strategy data from the server 5. In other cases, program control goes to the processing of FIG. 11 via the terminal A.

Where strategy data is obtained from the server 5, the recording setup information acquisition-and-setting portion 3111 of the data writing portion 311 reads out a list of registered medium IDs, for which strategy data have been obtained from the server 5, from the medium ID management file 318 (step S275). It is assumed that medium IDs associated with strategy data written into the optical disk drive 32 together with a corresponding data writing program, for example, when the program is installed into the data writing portion 311 are registered in the medium ID management file 318, as well as the data obtained from the server 5. Program control proceeds to the processing of FIG. 27 via a terminal G.

The processing of FIG. 27 is now described. The recording setup information acquisition-and-setting portion 3111 makes a decision as to whether the medium ID obtained in step S269 is contained in a list of registered medium IDs read out in step S275 (step S277). The setting portion 3111 makes a decision as to whether the medium ID obtained in step S269 is unregistered (step S279). Where the medium ID obtained in step S269 is already registered, it is determined that it is not necessary to obtain new strategy data this time. Program control proceeds to the processing of FIG. 11 via the terminal A. Description of the processing performed subsequently to the processing of FIG. 11 is omitted.

On the other hand, where the medium ID obtained in step S269 is unregistered, the recording setup information acquisition-and-setting portion 3111 reads the URL of the server 5 holding strategy data, for example, from the URL management file 313 (step S281). The URL of the server 5 may be managed by the body of the personal computer 31 or stored in the memory of the optical disk drive 32. In the latter case, the URL is received from the disk drive 32, for example, together with medium information.

Then, the recording setup information acquisition-and-setting portion 3111 sends the strategy data demand signal to the URL of the server 5 obtained in step S281 via the network 1 (step S283). The strategy data demand signal includes the drive ID acquired in step S261, the medium ID acquired in step S269, and a recording rate, for example as obtained in step S271. Where access to the server 5 is limited, for example, by membership, processing for a log-in is performed and then step S283 is carried out.

If the strategy data demand signal including the drive ID, the medium ID, and the recording rate is received from the personal computer 3 (step S285), the server 5 searches the strategy data storage portion 51 by the received drive ID, medium ID, and recording rate, reads out some or all pertinent strategy data items, and sends them to the requesting personal computer 3 (step S287). In the present embodiment the strategy data is held with a data structure as shown in FIG. 17. The recording setup information acquisition-and-setting portion 3111 of the data writing portion 311 of the personal computer 3 receives the pertinent novel strategy data from the server 5 and once stores the data, for example, into a hard disk drive (step S289). The medium ID obtained in step S269 is registered in the medium ID management file 318 (step S291). Program control then goes to the processing of FIG. 10 via the terminal C. Description of the processing performed subsequently to the processing of FIG. 10 is omitted.

By performing the processing described above, an access is made to the server 5 only when appropriate strategy data is not derived. Therefore, if the optical disk 7 on which data was previously recorded is used, data is appropriately recorded quickly without accessing the server 5.

Embodiment 7

A system associated with the present embodiment is schematically shown in FIG. 28. The present embodiment does not assume that the personal computer 3 is connected with the network 1.

The body of the personal computer 31 has a data writing portion 311 forming a main portion of the present embodiment, a reference value data file 315, and a strategy data storage portion 331 for storing a strategy data set. The data writing portion 311 includes a recording setup information acquisition-and-setting portion 3111. Data similar to data stored in the strategy data storage portion 51 in the first embodiment is stored in the strategy data storage portion 331. However, the data is not updated to the newest data because the personal computer is not connected with the network 1. The strategy data set stored in the strategy data storage portion 331 may be installed together with a data writing program when the data writing program forming a basis of the data writing portion 311 is installed into the body of the personal computer 31.

The optical disk drive 32 has a measurement processing portion 321 for performing a measurement to derive a material based on which a decision is made as to whether strategy data should be obtained from the outside, in addition to main functions including data recording function and data reading function. Furthermore, the disk drive 32 has a storage portion 323 for storing setup information for recording used by the data recording function and a writing portion 322 for writing setup information for recording. The writing portion 322 performs processing for storing setup information for recording into the recording setup information storage portion 323 according to an instruction from the recording setup information acquisition-and-setting portion 3111 of the data writing portion 311 of the body of the personal computer 31.

In this system, the subroutine of FIG. 29 of the processing flow of the first embodiment is performed instead of the subroutine of FIG. 9. Accordingly, the recording setup information acquisition-and-setting portion 3111 reads reference value data from the reference value data file 315 (step S301). Where reference value data is received from the optical disk drive 32, step S301 is omitted.

The recording setup information acquisition-and-setting portion 3111 judges the necessity of updating of the strategy data from the reference value data and from the result of measurement (step S303). For example, a decision is made as to whether the result of measurement is contained within a tolerable range, using an upper limit value (e.g., +α% or in mV) and a lower limit value (e.g., −β% or in mV) stipulating the tolerable range from a reference value, as well as the reference value. Alternatively, no reference value may be used, and the decision as to whether the result of measurement is contained within the tolerable range may be made, simply based on the upper and lower limit values stipulating the tolerable range. Still alternatively, a tolerable range may be defined, and ranges are defined outside the tolerable range. A decision may be made as to whether the result of measurement belongs to the first or second range, for example, that is outside the tolerable range. Moreover, α or β may be equal to 0.

Where the result of measurement is within the tolerable range and it is not necessary to update the strategy data (i.e., the decision at step S305 is negative (No)), program control proceeds to the processing of FIG. 11 via the terminal A. On the other hand, where the result of measurement is outside the tolerable range and it is necessary to update the strategy data (i.e., the decision at step S305 is affirmative (Yes)), the recording setup information acquisition-and-setting portion 3111 searches the strategy data storage portion 331 by search conditions including drive ID, medium ID, recording rate, and measurement result (or the difference from a reference value, gap from the reference value, or the range to which the measurement result belongs outside the tolerable range (e.g., whether the upper limit value is exceeded or the lower limit value is not reached)). Corresponding strategy data items are read out (step S307). Program control proceeds to the processing of FIG. 10 via the terminal C.

By performing the processing described so far, even in an environment where the computer is not connected with the network 1, appropriate strategy data can be set, and data recording can be made.

Embodiment 8

In the first embodiment, the body of the personal computer 31 makes a decision on the result of a measurement. The measurement itself is performed in the optical disk drive 32. If the reference value data is held either in the disk drive 32 or in a reference value data storage region 71 of the optical disk 7, the disk drive 32 can make a decision on the result of the measurement without problems.

A system based on this principle is schematically shown in FIG. 30. This system is similar to the system shown in FIG. 1 except that the reference value data storage portion 324 is formed in the optical disk drive 32 instead of the reference value data file 315 and that a novel decision processing portion 325 is formed in the disk drive 32.

The operation of the system shown in FIG. 30 is described below by referring to FIGS. 31 and 32. First, the data writing portion 311 is activated, for example, according to an instruction from a user of the personal computer 3 (step S331). The user sets an optical disk, on which data is to be recorded this time, on the spindle motor of the optical disk drive 32, for example, by inserting the disk into the disk drive 32 (step S333).

The data writing portion 311 of the body of the personal computer 31 outputs a drive ID demand signal to the optical disk drive 32 (step S335). In response to this, the disk drive 32 receives the drive ID demand signal from the data writing portion 311 (step S337). For example, the drive reads out a drive ID stored in the memory of the disk drive 32 and outputs the drive ID to the data writing portion 311 (step S339). The data writing portion 311 receives the drive ID from the disk drive 32 and stores it, for example, in a main memory (step S341). Where the drive ID has been already acquired as a data item constituting the personal computer 3 by the operating system (OS), the data writing portion 311 may use the data item instead of obtaining the drive ID using the steps S335-S341.

Furthermore, the data writing portion 311 outputs a medium information acquisition demand signal to the optical disk drive 32 (step S343). The disk drive 32 receives the acquisition demand signal (step S345), reads medium information including a medium ID from the optical disk set in step S333, and outputs the information to the data writing portion 311 (step S347). The data writing portion 311 receives the medium information from the disk drive 32 and stores it, for example, in the main memory (step S349). In some cases, the medium information includes a dedicated code indicating implementation of processing for obtaining strategy data from the server 5.

Additionally, the data writing portion 311 may prompt the user to enter an instruction indicating recording conditions (e.g., recording rate) or indicating whether or not strategy data should be gained from the server 5 or whether strategy data should be automatically gained from it. The data writing portion may accept an input (such as recording conditions) from the user (step S351).

The data writing portion 311 makes a decision as to whether strategy data should be obtained from the server 5 (step S353). For example, where an instruction is given from the user in step S351, if a dedicated code as described above is received in step S349, or if it has been confirmed that the personal computer 3 is connected with the network 1, the data writing portion judges that it acquires strategy data from the server 5. In other cases, program control goes to the processing of FIG. 11 via the terminal A.

Where strategy data is obtained from the server 5, the data writing portion 311 outputs a measurement instruction signal to the measurement processing portion 321 of the optical disk drive 32 (step S355). The measurement processing portion 321 of the drive 32 receives the measurement instruction signal from the data writing portion 311 (step S357) and performs measurement processing (step S359). Measurement processing associated with the present embodiment is similar to that shown in FIG. 8 or 12 and so its description is omitted herein. However, the measurement processing portion 321 outputs the result of the measurement to the decision processing portion 325. Program control proceeds to the processing of FIG. 32 via terminals H and J.

The processing of FIG. 32 is now described. The decision processing portion 325 reads reference value data from the reference value data storage portion 324 (step S361). The decision processing portion makes a decision as to whether it is necessary to update the strategy data from the reference value data and from the result of measurement (step S363).

For example, a decision is made as to whether the result of measurement is contained within a tolerable range, using an upper limit value (e.g., +α% or in mV) and a lower limit value (e.g., −β% or in mV) stipulating the tolerable range from a reference value, as well as the reference value. Alternatively, no reference value may be used, and the decision as to whether the result of measurement is contained within the tolerable range may be made, simply based on the upper and lower limit values stipulating the tolerable range. Still alternatively, a tolerable range may be defined, and ranges are defined outside the tolerable range. A decision may be made as to whether the result of measurement belongs to the first or second range, for example, that is outside the tolerable range. Moreover, α or β may be equal to 0.

The decision processing portion 325 outputs the result of measurement and the result of the decision made at step S363 to the data writing portion 311 of the body of the personal computer 31 (step S365). The recording setup information acquisition-and-setting portion 3111 of the data writing portion 311 of the body of the personal computer 31 receives the result of measurement and the result of decision from the optical disk drive 32 (step S367). The recording setup information acquisition-and-setting portion 3111 makes a decision as to whether it is necessary to update the strategy data (step S369). If the result of the decision is that it is not necessary to update the data, program control goes to the processing of FIG. 11 via the terminal A. On the other hand, if the result of the decision is that it is necessary to update the data, the recording setup information acquisition-and-setting portion 3111 reads the URL of the server 5 holding the strategy data, for example, from the URL management file 313 (step S371). The URL of the server 5 may be managed by the body of the personal computer 31. Alternatively, the URL may be stored in the memory of the optical disk drive 32, and the URL may be received from the disk drive 32, for example, together with medium information.

Then, the recording setup information acquisition-and-setting portion 3111 sends the strategy data demand signal to the URL of the server 5 obtained via the network 1 (step S373). The strategy data demand signal includes the drive ID, medium ID, a recording rate, for example as obtained in step S351, and the result of measurement (e.g., the gap from the reference value, the range to which the result of measurement belongs outside the tolerable range (for example, as to whether the upper limit value is exceeded or the lower limit value is not reached)). Where access to the server 5 is limited, for example, by membership, processing for a log-in is performed and then step S373 is carried out.

If the strategy data demand signal including the drive ID, the medium ID, the recording rate, and the result of measurement is received from the personal computer 3 (step S375), the server 5 searches the strategy data storage portion 51 by the received drive ID, medium ID, recording rate, and result of measurement, reads out some or all pertinent strategy data items, and sends them to the requesting personal computer 3 (step S377). The recording setup information acquisition-and-setting portion 3111 of the data writing portion 311 of the personal computer 3 receives the pertinent novel strategy data from the server 5 and once stores the data, for example, into a hard disk drive (step S379). Program control then goes to the processing of FIG. 10 via the terminal C.

The configuration of the data writing portion 311 is simplified by adopting the structure described above.

While embodiments of the present invention have been described so far, the invention is not limited thereto. For example, the features associated with the various embodiments can be combined in implementing the invention. For instance, the features associated with the eighth embodiment can be applied to the second embodiment.

The functional block diagrams may not always correspond to actual program modules.

Where measurement processing is performed, processing for judging whether each medium ID is genuine or false may also be conducted. That is, a decision is made as to whether a measurement result (e.g., reflectance) that would not take place if the optical disk 7 is a genuine type corresponding to a certain medium ID. For example, a reference value used for judging genuineness and data about a tolerance range are held. Where the value is outside the tolerable range, it is determined that the medium ID has been faked. Then, a warning is issued. In this case, the user is prompted to interrupt data recording. If the user gives an instruction, data may be recorded using standard strategy data.

Each of the personal computer 3 and server 5 is a computing system, for example. As shown in FIG. 33, in this computing system, a memory 2501 (storage portion), a CPU (processing portion) 2503, a hard disk drive (HDD) 2505, a display control portion 2507 connected with a display portion 2509, a drive unit 2513 for a removable disk 2511, an input device 2515, and a communication control portion 2517 for connection with a network are connected by a bus 2519. An operating system (OS) and application programs including a Web browser are loaded in the HDD 2505. When a program is run by the CPU 2503, the program is read into the memory 2501 from the HDD 2505. According to the need, the CPU 2503 controls the display control portion 2507, communication control portion 2517, and drive unit 2513 to cause them to perform necessary operations. Data being processed is stored in the memory 2501. If necessary, the data is stored in the HDD 2505. This computing system realizes the various functions as described above by organic cooperation between hardware units (such as the CPU 2503 and memory 2501), OS, and necessary application programs.

The structure and the operation of the present invention are not limited to the above descriptions. Various modifications may be made without departing from the spirit and scope of the present invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of setting setup information for recording to an optical disk, said method comprising: measuring an evaluation index associated with recording characteristics with which data is recorded on the optical disk by an optical disk drive for recording and reading; deciding that the measured evaluation index is outside a tolerable range of recording setup information previously set in the optical disk drive; acquiring novel recording setup information corresponding to at least a machine ID of the optical disk drive and a medium ID of the optical disk from a device external to the optical disk drive; and setting the acquired novel recording setup information in the optical disk drive.

2. A method of setting setup information for recording as set forth in claim 1, wherein said measuring comprises performing a test recording on the optical disk and measuring a signal obtained by reading data recorded by the test recording.

3. A method of setting setup information for recording as set forth in claim 2, wherein said measuring further comprises calculating said evaluation index from a result of the measurement of said signal.

4. A method of setting setup information for recording as set forth in claim 1, wherein said measuring comprises irradiating laser light and measuring reflected light without performing a test recording on the optical disk.

5. A method of setting setup information for recording as set forth in claim 4, wherein said measuring further comprises calculating said evaluation index from a result of the measurement of the reflected light.

6. A method of setting setup information for recording as set forth in claim 1, wherein said measuring comprises measuring a temperature in said optical disk drive.

7. A method of setting setup information for recording as set forth in claim 1, wherein data stipulating said tolerable range is read from any one of a storage device in said optical disk drive, a storage device in a computer connected with said optical disk drive, and said optical disk.

8. A method of setting setup information for recording as set forth in claim 1, wherein said acquiring comprises accessing a server holding plural kinds of recording setup information and downloading said novel recording setup information corresponding to at least the machine ID of the optical disk drive and the medium ID of the optical disk from the server, wherein said accessing the server comprises accessing the server over a network.

9. A method of setting setup information for recording as set forth in claim 1, wherein said acquiring comprises reading said novel recording setup information corresponding to at least the machine ID of the optical disk drive and the medium ID of the optical disk from a storage device in a computer connected to said optical disk drive, the storage device holding plural kinds of recording setup information.

10. A method of setting setup information for recording as set forth in claim 1, wherein said novel recording setup information further corresponds to said evaluation index or a gap from a reference value of the evaluation index.

11. A method of setting setup information for recording to an optical disk, said method comprising: deciding that new data recording is outside a reference range previously set for acquisition of novel recording setup information, the deciding comprising referring to a data storage which store historical information regarding recording of data onto the optical disk by an optical disk drive or regarding the acquisition of recording setup information previously set in the optical disk drive; acquiring said novel recording setup information corresponding to at least a machine ID of the optical disk drive and a medium ID of the optical disk from a device external to the optical disk drive when said novel data recording is judged to be outside said reference range; and setting the acquired novel recording setup information in the optical disk drive.

12. A method of setting setup information for recording as set forth in claim 11, wherein said previously set reference range includes conditions based on the number of recordings of data performed.

13. A method of setting setup information for recording as set forth in claim 11, wherein said previously set reference range includes conditions regarding an elapsed time from the time of previous acquisition or regarding whether novel recording setup information corresponding to the medium ID has been acquired.

14. A method of setting setup information for recording as set forth in claim 11, wherein said acquiring comprises accessing a server holding plural kinds of recording setup information and downloading said novel recording setup information corresponding to at least the machine ID of the optical disk drive and the medium ID of the optical disk from the server, wherein said accessing the server comprises accessing the server over a network.

15. A method of setting setup information for recording as set forth in claim 11, wherein said acquiring comprises reading said novel recording setup information corresponding to at least the machine ID of the optical disk drive and the medium ID of the optical disk from a storage device in a computer connected to said optical disk drive, the storage device holding plural kinds of recording setup information.

16. A computer readable medium storing a program for setting setup information for recording to an optical disk, the program being adapted to cause a computer to implement: obtaining a result of a measurement of an evaluation index associated with recording characteristics with which data is recorded on the optical disk by an optical disk drive for recording and reading; deciding that the measured evaluation index is outside a tolerable range of recording setup information previously set in the optical disk drive; acquiring novel recording setup information corresponding to at least a machine ID of the optical disk drive and a medium ID of the optical disk from a device external to the optical disk drive; and setting the acquired novel recording setup information in the optical disk drive.

17. A computer readable medium storing a program for setting setup information for recording as set forth in claim 16, wherein data stipulating said tolerable range is read from any one of a storage device in said optical disk drive, a storage device in a computer connected with said optical disk drive, and said optical disk.

18. A computer readable medium storing a program for setting setup information for recording as set forth in claim 17, wherein said acquiring comprises reading said novel recording setup information corresponding to at least the machine ID of the optical disk drive and the medium ID of the optical disk from a storage device in a computer connected to said optical disk drive, the storage device holding plural kinds of recording setup information.

19. A computer readable medium storing a program for setting setup information for recording as set forth in claim 17, wherein said recording setup information further corresponds to said evaluation index or a gap from a reference value of the evaluation index.

20. A computer readable medium storing a program for setting setup information for recording as set forth in claim 16, wherein said acquiring comprises accessing a server holding plural kinds of recording setup information and downloading said novel recording setup information corresponding to at least the machine ID of the optical disk drive and the medium ID of the optical disk from the server, wherein said accessing the server comprises accessing the server over a network.

21. A computer readable medium storing a program for setting setup information for recording to an optical disk, the program being adapted to cause a computer to implement: deciding that new data recording is outside a reference range previously set for acquisition of novel recording setup information, the deciding comprising referring to a data storage which stores historical information regarding recording of data onto the optical disk by an optical disk drive or regarding the acquisition of recording setup information previously set in the optical disk drive; acquiring said novel recording setup information corresponding to at least a machine ID of the optical disk drive and a medium ID of the optical disk from a device external to the optical disk drive; and setting the acquired novel recording setup information in the optical disk drive.

22. A computer readable medium storing a program for setting setup information for recording as set forth in claim 21, wherein said previously set reference range includes conditions based on the number of recordings of data performed.

23. A computer readable medium storing a program for setting setup information for recording as set forth in claim 21, wherein said previously set reference range includes conditions regarding an elapsed time from the time of previous acquisition or regarding whether novel recording setup information corresponding to the medium ID has been acquired.

24. A computer readable medium storing a program for setting setup information for recording as set forth in claim 21, wherein said acquiring comprises accessing a server holding plural kinds of recording setup information and downloading said novel recording setup information corresponding to at least the machine ID of the optical disk drive and the medium ID of the optical disk from the server, wherein said accessing the server comprises accessing the server over a network.

25. A computer readable medium storing a program for setting setup information for recording as set forth in claim 21, wherein said acquiring comprises reading said novel recording setup information corresponding to at least the machine ID of the optical disk drive and the medium ID of the optical disk from a storage device in a computer connected to said optical disk drive, the storage device holding plural kinds of recording setup information.

26. An optical disk drive for recording and reading data, comprising: means for measuring an evaluation index associated with recording characteristics with which data is recorded on an optical disk by the optical disk drive for recording and reading; means for deciding that the measured evaluation index is outside a tolerable range of recording setup information previously set in the optical disk drive; means for acquiring novel recording setup information corresponding to at least a machine ID of the optical disk drive and a medium ID of the optical disk from a device external to the optical disk drive; and means for setting the acquired novel recording setup information in the optical disk drive.

27. A data recording player as set forth in claim 26, wherein said measuring means comprises means for measuring a signal obtained by performing a test recording on the optical disk and reading data recorded by the test recording.

28. A data recording player as set forth in claim 27, wherein said measuring means further comprises means for calculating said evaluation index from the result of measurement of said signal.

29. A data recording player as set forth in claim 26, wherein said measuring means comprises means for irradiating laser light and measuring reflected light without performing a test recording on the optical disk.

30. A data recording player as set forth in claim 29, wherein said measuring means further comprises means for calculating said evaluation index from the result of measurement of said reflected light.

31. A data recording player as set forth in claim 26, wherein said measuring means comprises means for measuring temperature in said optical disk drive.

32. A data recording player as set forth in claim 26, wherein data stipulating said tolerable range is read from any one of a storage device in said optical disk drive, a storage device in a computer connected with said optical disk drive, and said optical disk.

33. A data recording player as set forth in claim 26, wherein said acquisition means comprises means for accessing a server holding plural kinds of recording setup information and means for downloading said novel recording setup information corresponding to at least the machine ID of the optical disk drive and the medium ID of the optical disk from the server, wherein said means for making accessing the server comprises means for accessing the server over a network.

34. A data recording player as set forth in claim 26, wherein said acquisition means comprises means for reading said novel recording setup information corresponding to at least the machine ID of the optical disk drive and the medium ID of the optical disk from a storage device in a computer connected to said optical disk drive, the storage device holding plural kinds of recording setup information.

35. A data recording player as set forth in claim 26, wherein said acquiring means comprises means for acquiring recording setup information that corresponds to said evaluation index or a gap from a reference value of the evaluation index.

36. A data recording player as set forth in claim 26, wherein said measuring means comprises a measurement processing unit, wherein said deciding means comprises a recording setup information decision unit, wherein said acquisition means comprises a setup information acquisition unit, and wherein said setting means comprises a setup information setting unit.

37. An optical disk drive for recording and reading data, comprising: means for deciding that new data recording is within a reference range previously set for acquisition of novel recording setup information, the deciding means comprising means for referring to a data storage which stores historical information regarding recording of data onto an optical disk by the optical disk drive for recording and reading or regarding the acquisition of recording setup information previously set in the optical disk drive; means for acquiring said novel recording setup information corresponding to at least a machine ID of the optical disk drive and a medium ID of the optical disk from a device external to the optical disk drive; and means for setting the acquired novel recording setup information in the optical disk drive.

38. A data recording player as set forth in claim 37, wherein said previously set reference range includes conditions based on the number of recordings of data performed.

39. A data recording player as set forth in claim 37, wherein said previously set reference range includes conditions regarding an elapsed time from the time of previous acquisition or regarding whether novel recording setup information corresponding to the medium ID has been acquired.

40. A data recording player as set forth in claim 37, wherein said acquisition means comprises means for accessing a server holding plural kinds of recording setup information and comprises means for downloading said novel recording setup information corresponding to at least the machine ID of the optical disk drive and the medium ID of the optical disk from the server, wherein means for accessing the server comprises means for accessing the server over a network.

41. A data recording player as set forth in claim 37, wherein said acquisition means comprises means for reading said novel recording setup information corresponding to at least the machine ID of the optical disk drive and the medium ID of the optical disk from a storage device in a computer connected to said optical disk drive, the storage device holding plural kinds of recording setup information.

42. A data recording player as set forth in claim 37, wherein said deciding means comprises a recording setup information decision unit, wherein said acquisition means comprises a setup information acquisition unit, and wherein said setting means comprises a setup information setting unit.

* * * * *